United States Patent
Gupta et al.

(10) Patent No.: US 12,321,403 B2
(45) Date of Patent: Jun. 3, 2025

(54) METHOD FOR PROVIDING A PERSONALIZED RESPONSE FOR AN ELECTRONIC DEVICE

(71) Applicant: SAMSUNG ELECTRONICS CO., LTD., Suwon-si (KR)

(72) Inventors: Vipul Gupta, Haryana (IN); Ankur Agrawal, Uttar Pradesh (IN); Rahul Agrawal, Madhya Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 17/878,301

(22) Filed: Aug. 1, 2022

(65) Prior Publication Data
US 2023/0090023 A1    Mar. 23, 2023

Related U.S. Application Data

(63) Continuation of application No. PCT/KR2022/007219, filed on May 20, 2022.

(30) Foreign Application Priority Data

Sep. 21, 2021 (IN) .............................. 202141042794

(51) Int. Cl.
G06F 16/00    (2019.01)
G06F 16/31    (2019.01)
(Continued)

(52) U.S. Cl.
CPC ........ G06F 16/9535 (2019.01); G06F 16/319 (2019.01); G06F 40/205 (2020.01)

(58) Field of Classification Search
CPC .. G06F 16/90332; G06F 16/367; G06F 40/30; G06F 16/3329; G10L 15/22;
(Continued)

(56) References Cited

U.S. PATENT DOCUMENTS 7,437,344 B2    10/2008    Peyrelevade
9,183,285 B1*   11/2015    Brown ................ G06F 16/355
(Continued)

FOREIGN PATENT DOCUMENTS

EP        3 783 496        2/2021
KR    10-2021-0100446      8/2021
(Continued)

OTHER PUBLICATIONS

International Search Report and Written Opinion of the International Searching Authority for PCT/KR2022/007219 mailed Aug. 18, 2022, 8 pages.

(Continued)

*Primary Examiner* — Yicun Wu
(74) *Attorney, Agent, or Firm* — Nixon & Vanderhye, P.C.

(57) ABSTRACT

The disclosure provides a method for receiving a query from a user of the electronic device, wherein the query is one of a voice query, a gesture query and a text query; determining an intermediate response for an augmented query; categorizing, by the electronic device, the intermediate response; selecting at least one other user communicating with the user of the electronic device for the determined category of the intermediate response; determining a perception of the at least one other user based on a profile of the at least one other user and a communication history with the at least one other user; and generating, by the electronic device, a final response for the user of the electronic device based on the perception of at least one other user and the determined intermediate response.

15 Claims, 22 Drawing Sheets

(51) Int. Cl.
*G06F 16/9535* (2019.01)
*G06F 40/205* (2020.01)

(58) Field of Classification Search
CPC ..... G10L 15/30; G10L 15/063; G06N 3/0464; G06N 3/006
See application file for complete search history.

(56) References Cited

U.S. PATENT DOCUMENTS

| | | | |
|---|---|---|---|
| 9,858,925 B2* | 1/2018 | Gruber | G10L 15/18 |
| 10,412,434 B1 | 9/2019 | Matthews | |
| 10,417,567 B1* | 9/2019 | Miller | G06N 5/04 |
| 10,657,960 B2 | 5/2020 | Tokunaga et al. | |
| 10,811,002 B2 | 10/2020 | Cho et al. | |
| 2008/0096533 A1 | 4/2008 | Manfredi et al. | |
| 2014/0317502 A1* | 10/2014 | Brown | G06Q 10/02 |
| | | | 715/706 |
| 2015/0186155 A1 | 7/2015 | Brown et al. | |
| 2017/0242899 A1* | 8/2017 | Jolley | G06F 16/242 |
| 2018/0061421 A1 | 3/2018 | Sarikaya | |
| 2018/0233139 A1 | 8/2018 | Finkelstein et al. | |
| 2018/0268818 A1 | 9/2018 | Schoenmackers et al. | |
| 2019/0122001 A1* | 4/2019 | Bradley | H04W 12/02 |
| 2020/0125967 A1 | 4/2020 | Seo et al. | |
| 2021/0027759 A1 | 1/2021 | Ogawa et al. | |
| 2021/0134270 A1 | 5/2021 | Rakshit et al. | |
| 2021/0165698 A1* | 6/2021 | Davlos | G06F 11/0766 |
| 2022/0036897 A1 | 2/2022 | Saito | |
| 2022/0129556 A1* | 4/2022 | Chen | G06F 21/74 |

FOREIGN PATENT DOCUMENTS

| | | |
|---|---|---|
| WO | 2020/116026 | 6/2020 |
| WO | 2020/242595 | 12/2020 |

OTHER PUBLICATIONS

[Online], "What are the problems encountered by Virtual Assistant", www.quora.com/What-are-the-problems-encountered-by-Virtual-Assistant, Jul. 2021, 2 pages.
[Online], "Android Intelligence Analysis—The downfall of the virtual assistant", www.computerworld.com/article/3403332/downfall-virtual-assistant.html, Jun. 2019, 3 pages.
Extended Search Report dated Jul. 19, 2024 in European Patent Application No. 22873060.2.
Examination Report dated Oct. 3, 2023 in Indian Patent Application No. 202141042794 and English-language translation.

* cited by examiner

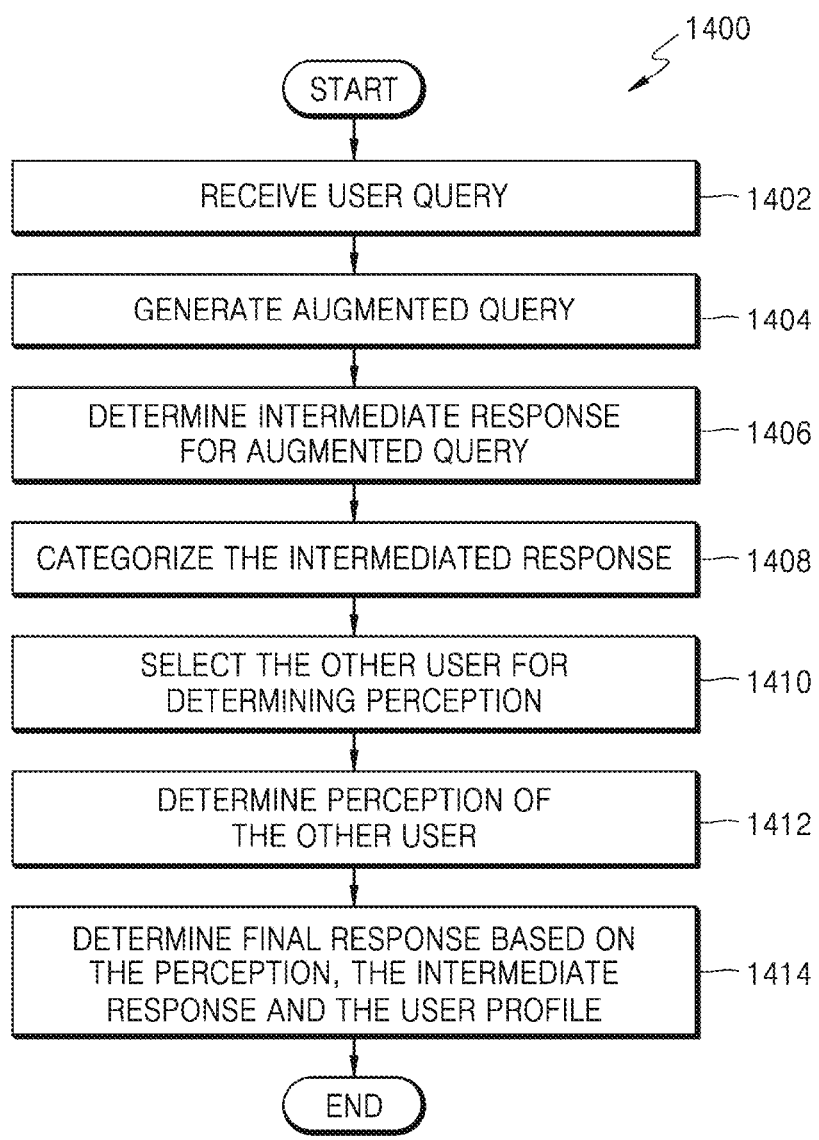

METHOD FOR PROVIDING A PERSONALIZED RESPONSE FOR AN ELECTRONIC DEVICE

CROSS-REFERENCE TO RELATED APPLICATIONS

This application is a continuation of International Application No. PCT/KR2022/007219 designating the United States, filed on May 20, 2022, in the Korean Intellectual Property Receiving Office and claiming priority to Indian Patent Application No. 202141042794, filed on Sep. 21, 2021, in the Indian Patent Office, the disclosures of which are incorporated by reference herein in their entireties.

BACKGROUND

Field

The disclosure relates to IoT devices and, for example, relates to a method of providing personalised response for a Virtual Assistant (VA) device in an Internet of Things (IoT) environment.

Description of Related Art

Use of a VA device is increasing rapidly in real world scenarios. A user inputs a query to the VA device and the VA device provides the response accordingly. However, the response provided by the existing VA device is not personalized with respect to the user. The response provided by the VA device may be useful for one user and may be harmful for other user. Thus the VA response should be personalized based on a profile of the user.

FIG. 1 is a diagram, illustrating problems of the existing VA device.

As seen in FIG. 1, Suraj 1 is a 10 year old boy and is asking a query 2 "Hey, Can you please play Johnny Johnny" to a VA device 3. The boy Suraj 1 intends to listen to kids rhyme "Johnny Johnny", however the VA device 3 in response to the query 2 plays a song from a movie "Johnny Johnny" as seen at 5. Thus as seen, the response of the VA device 3 is incorrect. Moreover the song from the movie "Johnny Johnny" played by the VA device 3 may not be suitable for the 10 year old. After listening to the response from the VA device 3, Suraj's mother 4 is surprised and according to the mother 4 the song played by the VA device 3 is harmful and useless for Suraj 1. Thus as seen, a response content received from the VA device 3 is not a useful for children. It's harmful as the song played is an adult song. Hence it is necessary to provide a personalised response based on a first user from whom the query is received as well as other users.

FIG. 2 is a diagram, illustrating an example with the problems of the existing VA device.

As seen in FIG. 2, an old person 1 who is diabetic. The old person 1 is asking a query 2 "Hey, Order a Vanilla Ice cream" to the VA device 3. The VA device 3 in response to the query 2 orders the vanilla ice cream and provides response as "Ordering a Vanilla Ice cream from Baskin's" to the old person 1 at 4. However, the old person's son 5 is worried as the old person 1 is diabetic and the son does not want the VA device 3 to order the ice cream for the old person 1.

Thus as seen, the response of the VA device 3 is not appropriate and is harmful for the old person 1. Hence it is necessary to provide the personalized response based on a recommendation of another users associated with the first user communicating with the VA device 3.

Thus as seen above, the VA device 3 is not intelligent enough to resolve the user query in a personalized way so that the personalized response is harmless and useful.

Thus, it is necessary to provide a method and the VA device for providing the personalized response which is harmless and useful to the user.

SUMMARY

Embodiments of the disclosure provide a method and a VA device for providing personalized response which is useful to a first user.

Embodiments of the disclosure provide personalised response based on another user associated with the first user communicating with the VA device.

Accordingly, example embodiments herein disclose a method for providing a personalized response from an electronic device in an Internet of Things (IoT) environment, the method comprising: receiving, by the electronic device, a query, where the query includes one of a voice query, a gesture query and a text query; determining, by the electronic device, an intermediate response for an augmented query; categorizing, by the electronic device, the intermediate response; selecting, by the electronic device, at least one other user communicating with a user of the electronic device for the determined category of the intermediate response; determining, by the electronic device, a perception of the at least one other user based on a profile of the at least one other user and a communication history with the at least one other user; and generating, by the electronic device, a final response based on the perception of at least one other user and the determined intermediate response.

In an example embodiment, wherein the determining the intermediate response for an augmented query comprises: obtaining, by the electronic device, the user profile associated with the user of the electronic device based on the query, wherein the user profile comprises at least one of age profile data, work profile data and health profile data of the user of the electronic device; mapping, by the electronic device, keywords in the query with keywords of the user profile; assigning, by the electronic device, a weight to each mapping; selecting, by the electronic device, keywords from the user profile and the keywords from the user query having a highest weight; generating, by the electronic device, the augmented query using the words having the highest weight in the query and the corresponding information in the user profile; and determining, by the electronic device, the intermediate response for the augmented query.

In an example embodiment, the intermediate response includes a default response of the electronic device for the query without usage of the user profile information. Further, categorizing the intermediate response comprises: extracting, by the electronic device, features from the intermediate response, wherein each text from the intermediate response is transformed to a feature set in form of a vector; training, by the electronic device, a Machine Learning (ML) model specific to categorization of the intermediate response using the extracted features; and receiving, by the electronic device, a predicted category of the intermediate response from the ML model.

In an example embodiment, the selecting by the electronic device, at least one other user comprises: determining, by the electronic device, a list of other users with whom the user is interacted for the predicted category of the intermediate response; and selecting, by the electronic device, the at least one other user from the list of other users based on an interaction rule.

In an example embodiment, the determining the perception of the at least one other user comprises: determining, by the electronic device, at least one interaction of the at least one user with the user of the electronic device for a predicted category; obtaining, by the electronic device, a parsed text from the at least one interaction based on the keywords of the intermediate response; detecting electronic device, a change in a context in the at least one interaction based on the parsed text; obtaining, by the electronic device, a parsed context, wherein the parsed context determines a context of the at least one interaction; detecting, by the electronic device, a conclusion marker in the at least one interaction, wherein the conclusion marker indicates a conclusion derived in the at least one interaction for the determined context; determining, by the electronic device, a perception word based on the conclusion marker, wherein the perception word indicates the perception of the at least one other user for the intermediate response; and generating, by the electronic device, the perception of the at least one other user based in the perception word, the user profile and the intermediate response using Natural Language Processing (NLP).

In an example embodiment, the generating, the final response for the user based on the combination of the perception of at least one other user and the determined intermediate response comprises: merging, by the electronic device, the perception of at least one other user and the intermediate response for obtaining a merged response; determining, by the electronic device, at least one slot in the merged response, wherein the slot indicates variable words in the merged response to be replaced by other words corresponding to the user of the electronic device; selecting, by the electronic device, a user template from a template database based on the category of the intermediate response and the interaction of the user of the electronic device and the at least one other user; encoding, by the electronic device, the user template, the merged response, and the interaction of the user and the at least one other user to obtain a combination paraphrase in form of a vector; decoding, by the electronic device, the combination paraphrase to generate an interaction personalized paraphrase; determining, by the electronic device, that a semantic of the intermediate response and the combination paraphrase is matching; and generating, by the electronic device, the final response of the electronic device based on the combination paraphrase.

Accordingly various example embodiments herein disclose an electronic device electronic device for providing personalized response in the Internet of Things (IoT) environment, the electronic device comprising: a memory; and a processor configured to: receive a query, wherein the query includes one of a voice query, a gesture query and a text query, determine an intermediate response for the augmented query; categorize the intermediate response; select at least one other user communicating with the user of the electronic device for the determined category of the intermediate response; determine a perception of the at least one other user based on the profile of the at least one other user and the communication history with the at least one other user; and generate a final response for the user of the electronic device based on the perception of at least one other user and the determined intermediate response.

These and other aspects of various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a flowchart, illustrating an example method for providing a personalized response, according to various embodiments.

DETAILED DESCRIPTION

Figure 1:
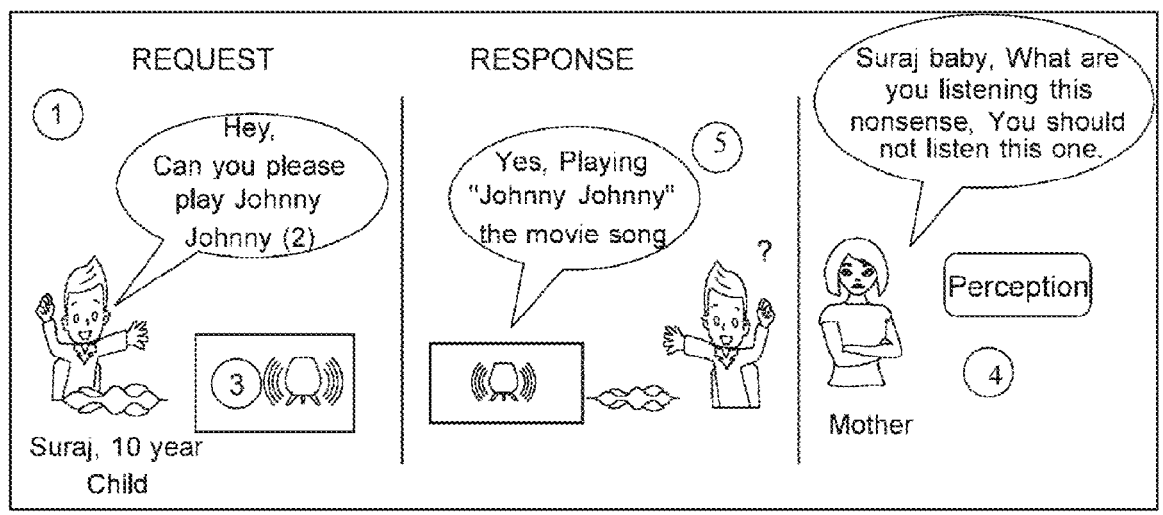
FIG. 1 is a diagram, illustrating problems of the existing VA device.
Figure 2:
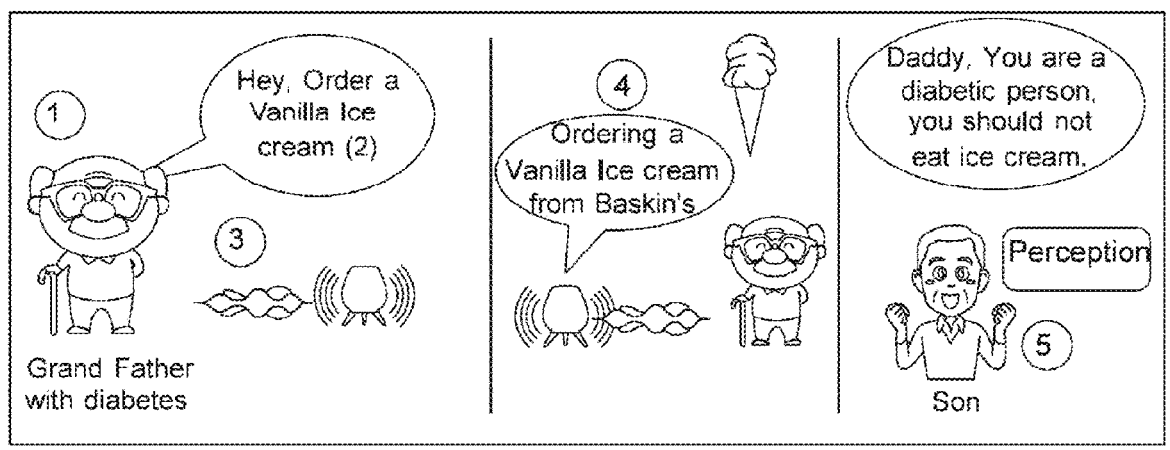
FIG. 2 is a diagram, illustrating an example with the problems of the existing VA device.

The various example embodiments herein and the various features and advantageous details thereof are explained more fully with reference to the non-limiting embodiments that are illustrated in the accompanying drawings and described in the following description. Descriptions of well-known components and processing techniques may be omitted where they may unnecessarily obscure the embodiments herein. The various example embodiments described herein are not necessarily mutually exclusive, as various embodiments can be combined with one or more various embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for providing a personalized response from an electronic device in an Internet of Things (IoT) environment.

In an embodiment, the disclosed method and device discloses generating an augmented query based on a query received by the electronic device. An intermediate response for the augmented query is obtained from the electronic device. Further, a recommendation from at least one other user is obtained and merged with the intermediate response. A final response is then generated for the user query, which is harmless and useful to a user communicating with the electronic device.

Unlike existing methods and systems, the disclosed method makes a virtual assistant device intelligent enough to provide the personalized response to the user which is harmless, useful and understandable for the user conversing with the virtual assistant device. The disclosed method uses a secure environment which enables multiple virtual assistant device to intelligently and securely share behavioral learning with each other to enhance a personalization during a conversation.

Referring now to the drawings, and for example, to FIGS. 3 through 14, where similar reference numerals refer to similar features consistently throughout the figures, there are shown various example embodiments.

Figure 3:
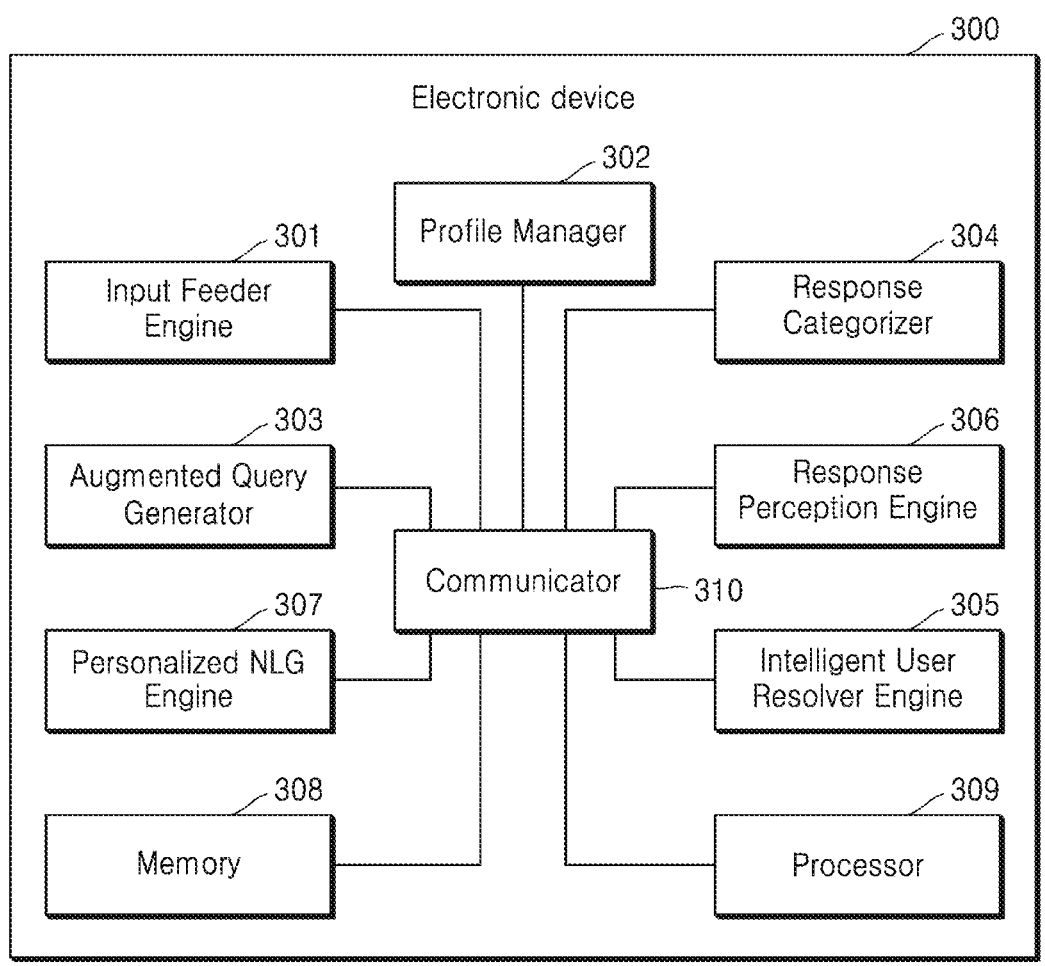
FIG. 3 is a block diagram illustrating an example configuration of an electronic device for providing a personalized response which is useful and harmless to a user, according to various embodiments.

FIG. 3 is a block diagram illustrating an example configuration of an electronic device 300 for providing a personalized response which is useful and harmless, according to various embodiments.

As seen in FIG. 3, the electronic device 300 is present in an IoT environment. The electronic device 300 may be, for example, but not limited, to a mobile device, a cellular phone, a smart phone, a Personal Digital Assistant (PDA), a tablet computer, a laptop computer, an Internet of things (IoT) device, an Artificial intelligent (AI) device, a Virtual Assistant (VA) device, a wearable device or the like.

In an embodiment, the electronic device 300 includes an input feeder engine 301, a profile manager 302, an augmented query generator 303, a response categorizer 304, an intelligent user resolver engine 305, a response perception engine 306, a personalised Natural Language Generation (NLG) engine 307, each of which may include various processing circuitry and/or executable program instructions, a memory 308, a processor (e.g., including processing circuitry) 309, and a communicator (e.g., including communication circuitry) 310.

In an embodiment, a first user is communicating with the electronic device 300 and send a query to the electronic device 300. The query to the electronic device 300 may be for example but not limited to a voice query, a text query or a gesture query.

Upon receiving the query, the input feeder engine 301 pre-processes the query and fetches user profiles from the profile manager 302. During pre-processing, the input feeder engine 301 normalizes the user query. After normalization, the input feeder engine 301 obtains token words from the normalized query, wherein the token words are picked from the user query. Further the input feeder engine 301 performs stemming and lemmatization of the tokenized words. Based on the pre-processing, the input feeder engine 301 selects a user profile corresponding to the user, stored in the memory 308 and managed by the profile manager 302.

The profile manager 302 stores the profiles of all the user associated with the electronic device 300. Each user profile comprises three personalized local data for the corresponding user such as work data comprising work related information of the user, health data comprising health related information of the user and age data comprising age related information of the user, also termed as a work profile, a health profile and an age profile of the user respectively.

The pre-processed user query and the corresponding user profile is sent as an input to the augmented query generator 303. The augmented query generator 303 maps the token words of the query with keywords of the user profile. A weight is assigned to each mapping and accordingly words with highest mapping are selected for augmenting the query. Based on the selected words, an augmented query is generated using Natural Language Processing (NLP). The augmented query is an enhanced query for producing more meaningful and personalized response from the electronic device 300.

The augmented query is further shared with the response categorizer 304. An intermediated response is generated for the augmented query by the response categorizer 304. Further, the intermediate response is categorized into different categories based on a content in the intermediate response. The different categories may be for example, but not limited to food, education, travel, health, and sports. A machine learning approach specific to categorization is used for categorizing the intermediate response into the different categories.

Once the response is categorized, the user resolver engine 305 determines another user associated with the user communicating with the electronic device 300 for the category of the intermediate response.

In an embodiment, the user resolver engine 305 uses an interaction rule for determining the other user. The user resolver engine 305 analyses communication between the user of the electronic device 300 and all other users associated with the category based on the interaction rule. For example, if the category of the intermediate response is determined as food, then the interaction rule will identify the other user with whom the user of the electronic device 300 often communicates relating to food.

Once the other user is identified, the response perception engine 306 determines a perception of the other user on the query of the user of the electronic device 300. The communication between the other user and the user of the electronic device 300 is analysed based on a context of the query and the perception of the other user is determined. In an embodiment, if the query of the user of the electronic device 300 is "order a vanilla ice-cream", wherein the user is a diabetic person, and the other user identified is a son of the diabetic person. Then the response perception engine 306 analyses communication between the diabetic person and the son for diabetes. Thus the perception of the son is that the father (user) should not eat a food contains sugar as the user is diabetic.

After determining the perception of the other user on the query of the user of the electronic device 300, the personalised NLG engine 307 merges the perception of the other user and the intermediate response to obtain a final response to the query of the user.

The memory 308 stores instructions to be executed by the processor 309 for providing personalised response. In an embodiment, the memory 308 also stores the user profiles associated with different users, the intermediate response, the augmented query, the communication between the user of the electronic device 300 and the other users.

The above described at least one of the plurality of modules/components may be implemented through an Artificial Intelligence (AI) model. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning may refer, for example, to, by applying a learning process to a plurality of learning data, a predefined operating rule or AI model of a desired characteristic being made. The learning may be performed in a device itself in which AI according to an embodiment is performed, and/o may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The memory 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 308 may, in some examples, be considered a non-transitory storage medium. The term "non-transitory" may indicate that the storage medium is not embodied in a carrier wave or a propagated signal. However, the term "non-transitory" should not be interpreted that the memory 308 is non-movable. In some examples, the memory 308 can be configured to store larger amounts of information than the memory. In certain examples, a non-transitory storage medium may store data that can, over time, change (e.g., in Random Access Memory (RAM) or cache). The memory 308 can be an internal storage or it can be an external storage unit of the electronic device 300, a cloud storage, or any other type of external storage.

In an embodiment, the processor 309 may include various processing circuitry and communicates with the memory 308, the communicator 310, the input feeder engine 301, the profile manager 302, the augmented query generator 303, the response categorizer 304, the user resolver engine 305, the response perception engine 306, and the personalised NLG engine 307. The processor 309 is configured to execute instructions stored in the memory 308 for providing personalised the response. The processor 309 may include, for example, and without limitation, one or a plurality of processors, may be a general purpose processor, such as a central processing unit (CPU), an application processor (AP), a dedicated processor, or the like, a graphics-only processing unit such as a graphics processing unit (GPU), a visual processing unit (VPU), and/or an Artificial intelligence (AI) dedicated processor such as a neural processing unit (NPU).

In an embodiment, the communicator 310 may include various communication circuitry and is configured for communicating internally between internal hardware components and with external devices via one or more networks. The communicator 310 includes an electronic circuit specific to a standard that enables wired or wireless communication.

The input feeder engine 301, the profile manager 302, the augmented query generator 303, the response categorizer 304, the user resolver engine 305, the response perception engine 306, and the personalised NLG engine 307 are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Thus as seen above, the disclosed method and the electronic device 300 provides the personalised response which are useful and harmless to the user of the electronic device 300.

Although FIG. 3 shows various hardware components of the electronic device 300 but it is to be understood that various embodiments are not limited thereon. In various embodiments, the electronic device 300 may include less or more number of components. Further, the labels or names of the components are used only for illustrative purpose and does not limit the scope of the disclosure. One or more components can be combined together to perform same or substantially similar function for providing the useful and harmless personalised response.

Figure 4A:
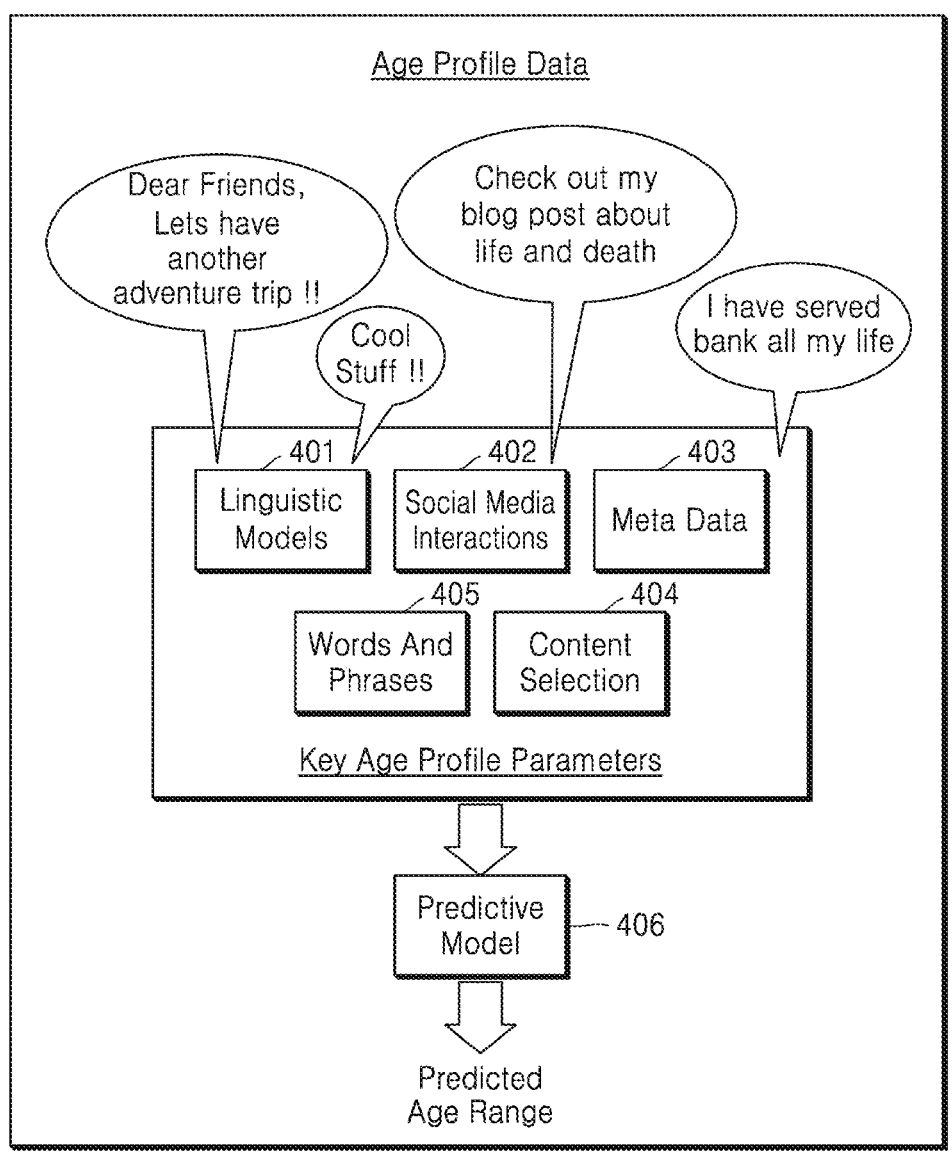
FIG. 4A is a diagram illustrating example age profile data of the user managed by the profile manager, according to various embodiments.

FIG. 4A is a diagram illustrating example age profile data of the user managed by the profile manager 302, according to various embodiments.

As seen in FIG. 4A, the profile manager 302 is responsible for determining an age of the user. In an embodiment, key age profile parameters are obtained based on interaction of the user on different social media platforms or communication of the user with another user via different applications in the electronic device 300.

As seen in FIG. 4A, 401 is a linguistic model which collects information about communication of the user with respect to the age. 402 indicates the social media interactions, each of which may include various processing circuitry and/or executable program instructions. 403 is a metadata obtained by the linguistic model 401. 404 shows content related to the age selected by the linguistic model obtained from the interaction of the user on different platforms from which words and phrases indicating the age of the user are obtained as seen at 405.

A predictive model 406 specific to age prediction determines the age of the user based on the information obtained in block 401-404. Thus the age of the user is determined and stored for assisting generating personalised responses for the user. In an embodiment, the age of the user may be determined in real-time.

Figure 4B:
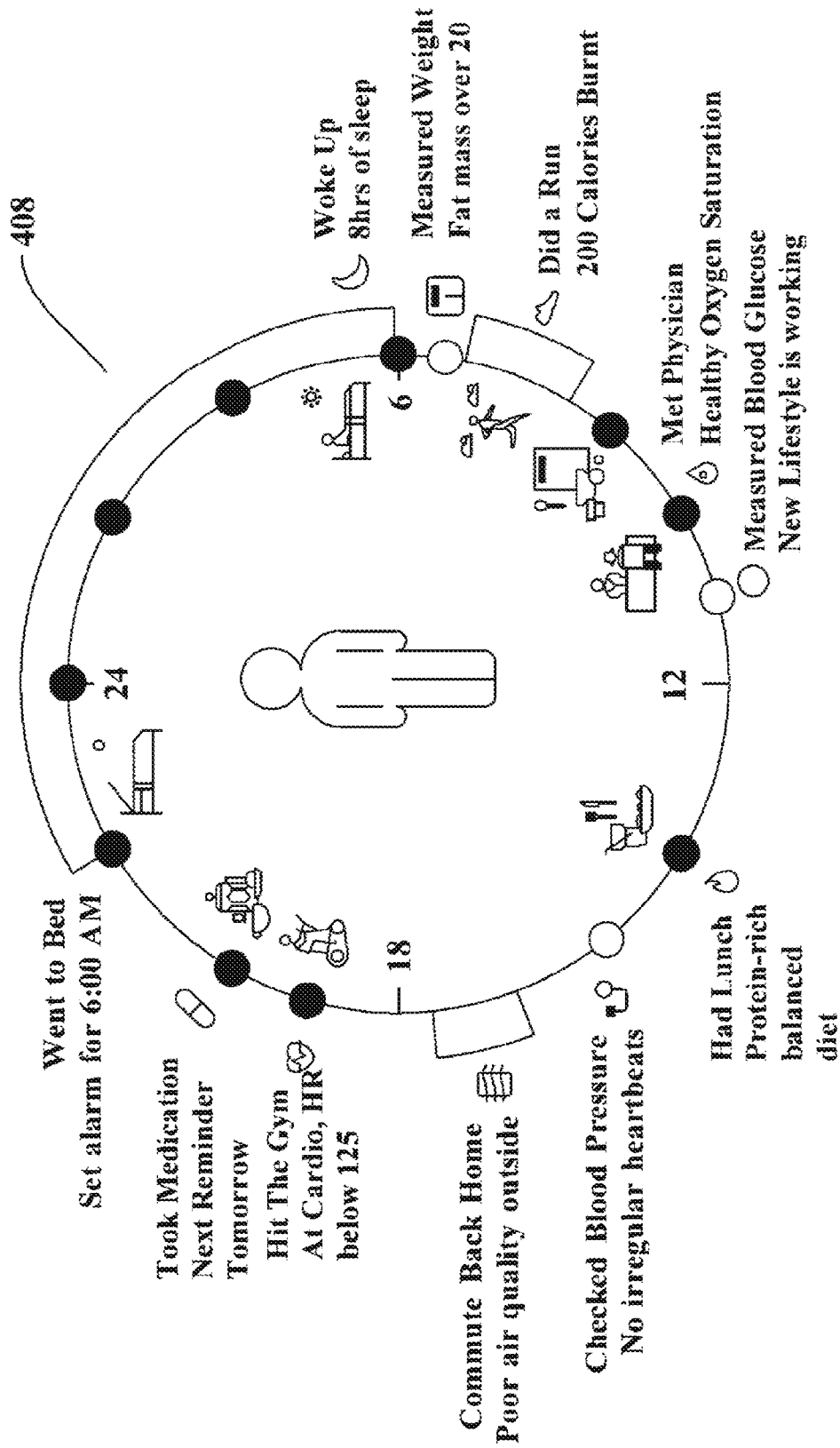
FIG. 4B is a diagram illustrating example health profile data of the user managed by the profile manager, according various embodiments.

FIG. 4B is a diagram illustrating example health profile data of the user managed by the profile manager 302, according to various embodiments.

As seen in FIG. 4B, the profile manager 302 is responsible for determining the health of the user. In an embodiment, key health profile parameters are obtained from different platforms such as blood reports, doctor visit details, a calorie intake, gender and age details, a parent health history, a wearable device health parameter and the like. As seen in FIG. 4B, 408 displays a daily routine of the user. Based on the daily routine, the health of the user is determined and managed by the profile manger 302. For example, waking time, sleeping time, lunch time etc. are determined for the user. From the routine of the user, the health of the user is obtained.

Thus the health of the user is determined and stored for assisting generating the personalised response for the user. In an embodiment, the health of the user may be determined in real-time.

Figure 4C:
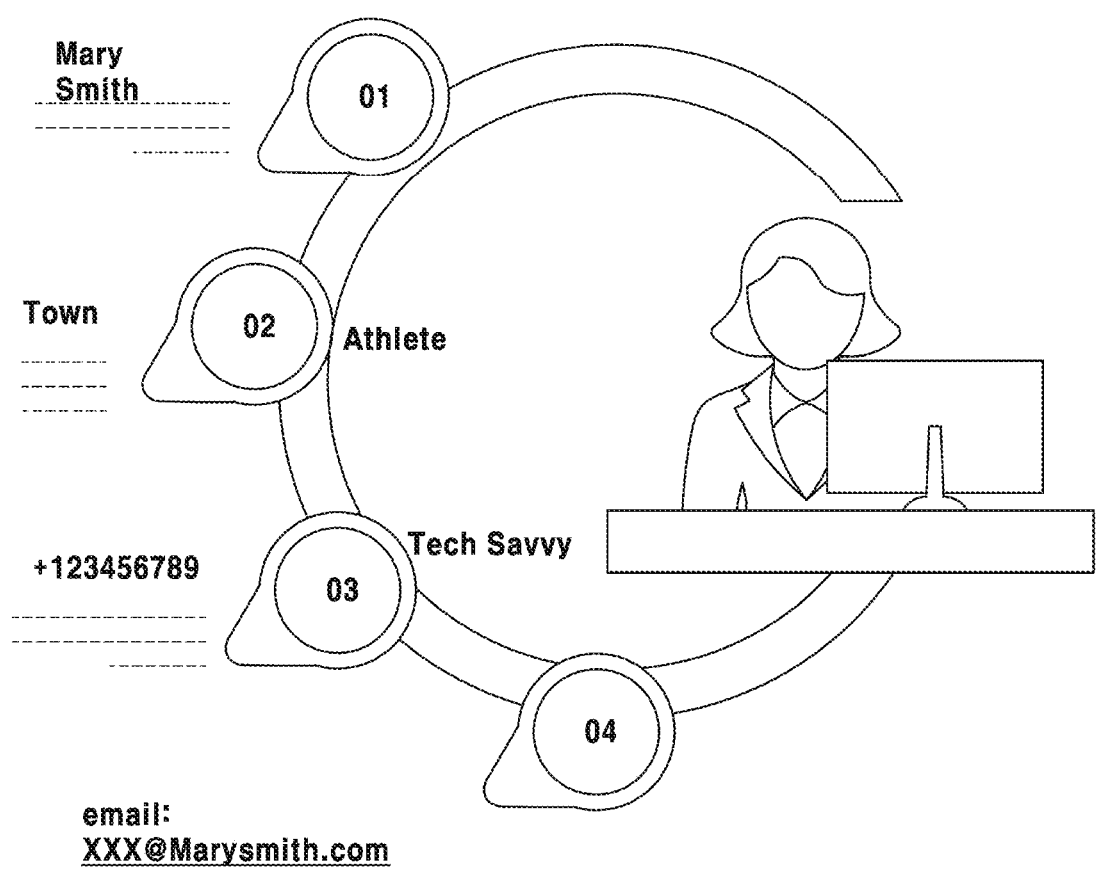
FIG. 4C is a diagram illustrating example work profile data of the user managed by the profile manager, according to various embodiments.

FIG. 4C is a diagram illustrating example work profile data of the user managed by the profile manager 302, according to various embodiments.

As seen in FIG. 4C, the profile manager 302 is responsible for determining the work related information based on key work profile parameters. The key work profile parameters comprises a work place related details, a field of expertise, an academic history of the user, finance handling information and interaction with office colleagues. Based on the key work profile parameters, the user may be determined as a banker, an athlete, a computer professional, a stock investor/broker and the like. In the present embodiment, the user with profile 1 is the banker, user with profile 2 is the athlete and user with profile 3 is the computer professional.

Thus, the work related details of the user is determined and stored for assisting generating personalised responses for the user. In an embodiment, the work-related details of the user may be determined in real-time.

Figure 4D:
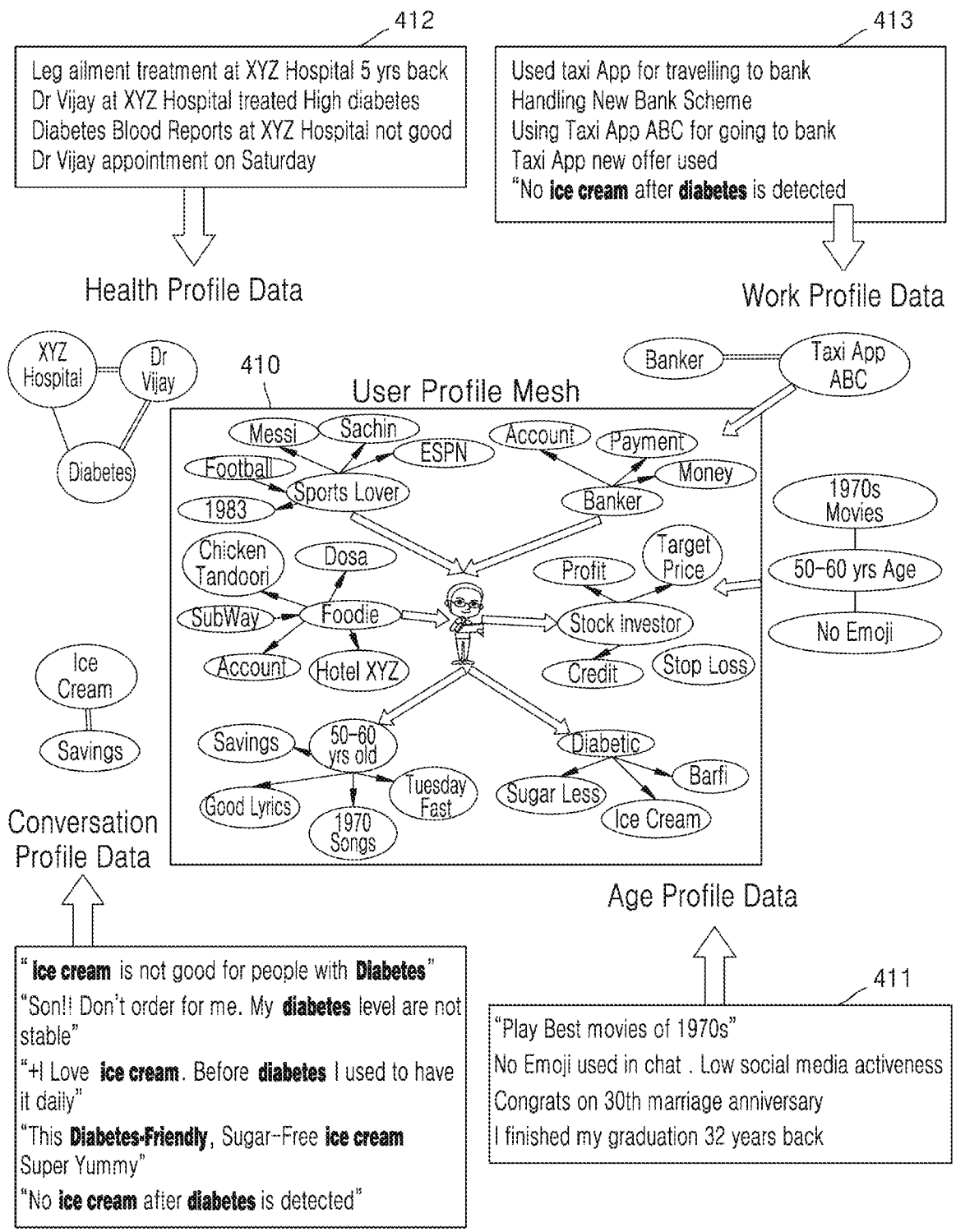
FIG. 4D is a diagram illustrating example user profile mesh comprising the work profile data, the health profile data and the age profile data of the user, according to various embodiments.

FIG. 4D is a diagram, illustrating an example user profile mesh 410 comprising the work profile data, the health profile data and the age profile data of the user, according to various embodiments.

In an embodiment, a generic user profile including the age profile 411, the health profile 412 and the work profile 413 are mapped to the keywords used by the user any time during the interaction with the device.

In an embodiment, the profile manager 302 obtains keywords from different interactions of the user and maps them with the health profiles.

As seen in FIG. 4D, the profile mesh 410 comprises information obtained from different profiles. For example, the profile manager 302 determines that the user has diabetes from interactions such as "Ice Cream is not good for people with Diabetes, Son!! Don't order for me. My diabetes level are not stable, This Diabetes-Friendly, Sugar-Free Ice-Cream, Super Yummy" etc.

Similarly the age profile and work profile data is obtained as seen in FIG. 4D.

Figure 5A:
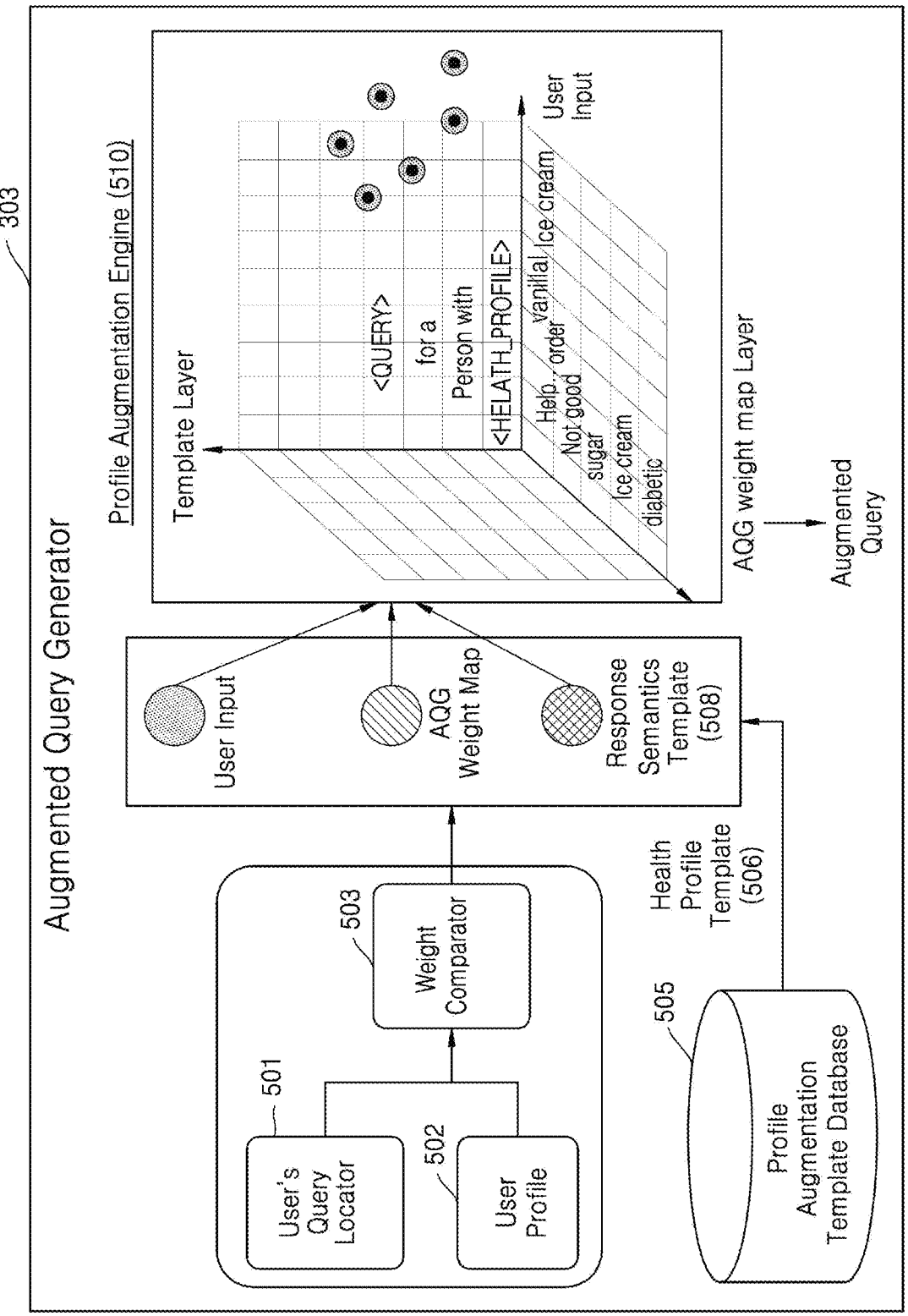
FIG. 5A is block diagram illustrating an example configuration of an augmented query generator for generating an augmented query, according to various embodiments.

FIG. 5A is a block diagram illustrating an example configuration of the augmented query generator 303 for generating the augmented query, according to various embodiments.

As seen in FIG. 5A, the augmented query generator 303 comprises a weight comparator 503 and a profile augmentation engine 510, each of which may, for example, include various processing circuitry and/or executable program instructions. The input to the weight comparator 503 is the user query 501 and the user profile 502 selected for the user of the electronic device 300. Upon receiving the inputs an augmented query generation map is obtained, wherein the keywords from the query are mapped with the keywords in the user profile. The weight map helps to predict the word that needs to be used to augment the query of the user and enhance the query for producing more meaningful and personalized response. The weight comparator 503 is used for determining the highest probable words from the augmented query generation map.

In an example, consider the query is "help me order me a vanilla ice-cream", table 1 displays the score based on each interaction. Each word pair such as "ice-cream-diabetes", "age-62-help me order", "diabetes-help me order" score are assigned for occurrence, importance factor and value based on the interaction as shown in table 2. Thus a highest score obtained is for the words "ice-cream" and "diabetes" and hence the words "ice-cream" and "diabetes" are chosen as the highest probable keywords for augmentation of the user query.

TABLE 1

| Word Pair | Occurrence | Importance Factor | Value |
|---|---|---|---|
| Diabetes-ice-cream | 4 | 0.7 | 0.92 |
| Age:62- Help me order | 5 | 0.8 | 0.76 |
| Investor-Help me order | 2 | 0.6 | 0.65 |
| Diabetes-Help me order | 1 | 0.5 | 0.14 |

TABLE 2

"Ice-Cream is not good for people with Diabetes"
"Son !! Don't order for me. My diabetes level are not stable"
"I love ice cream. Before diabetes I use to have daily"
"This Diabetes Friendly. Sugar Free Ice-cream Super yummy"
"NO ice-cream after diabtes is detected"

Further, it is determined that ice-cream and diabetes has negative association indicating that ice-cream is not good for a diabetic person. The negative association is determined based on interactions of the user such as "ice-cream is not good for people with diabetes", "Son, Don't order for me. My diabetes levels are not stable", "No ice-cream after diabetes is detected" using Natural Language Processing (NLP). Similarly a positive association is determined based on interactions of the user such as "healthy food is good for people with diabetes", "Son, I will only eat health food as my diabetes levels are not stable", "Doctor recommended me only health food as I am a diabetic person" using Natural Language Processing (NLP).

After determining, the highest probable words and association of the words, the augmented query generator 303 augments the query based on a user template.

In an embodiment, the augmented query generator 303 comprises the profile augmentation engine 10 which takes three inputs: the user query, the highest probable word pair, and the selected user profile based template to encode data in the inputs in a format which is more personalized for the user and further decode to form a query with profile augmentation making the query more meaningful for the electronic device 300.

The templates for generation of the augmented query is pre-stored in a profile augmentation template database 505 for each user based on the corresponding user profile. In an embodiment, the profile augmentation template database 505 a health profile template 506 and a response semantic template 508.

The profile augmentation engine 510 uses NLP and generates the augmented query based on the user template. For example if the input query is "Help me order a vanilla ice-cream" for a diabetic user, then the augmented query generated is "Help me order a Vanilla Ice Cream for a Person with diabetes".

Thus the augmented query is more helpful in generating the personalized response which is harmless and useful to the user.

Figure 5B:
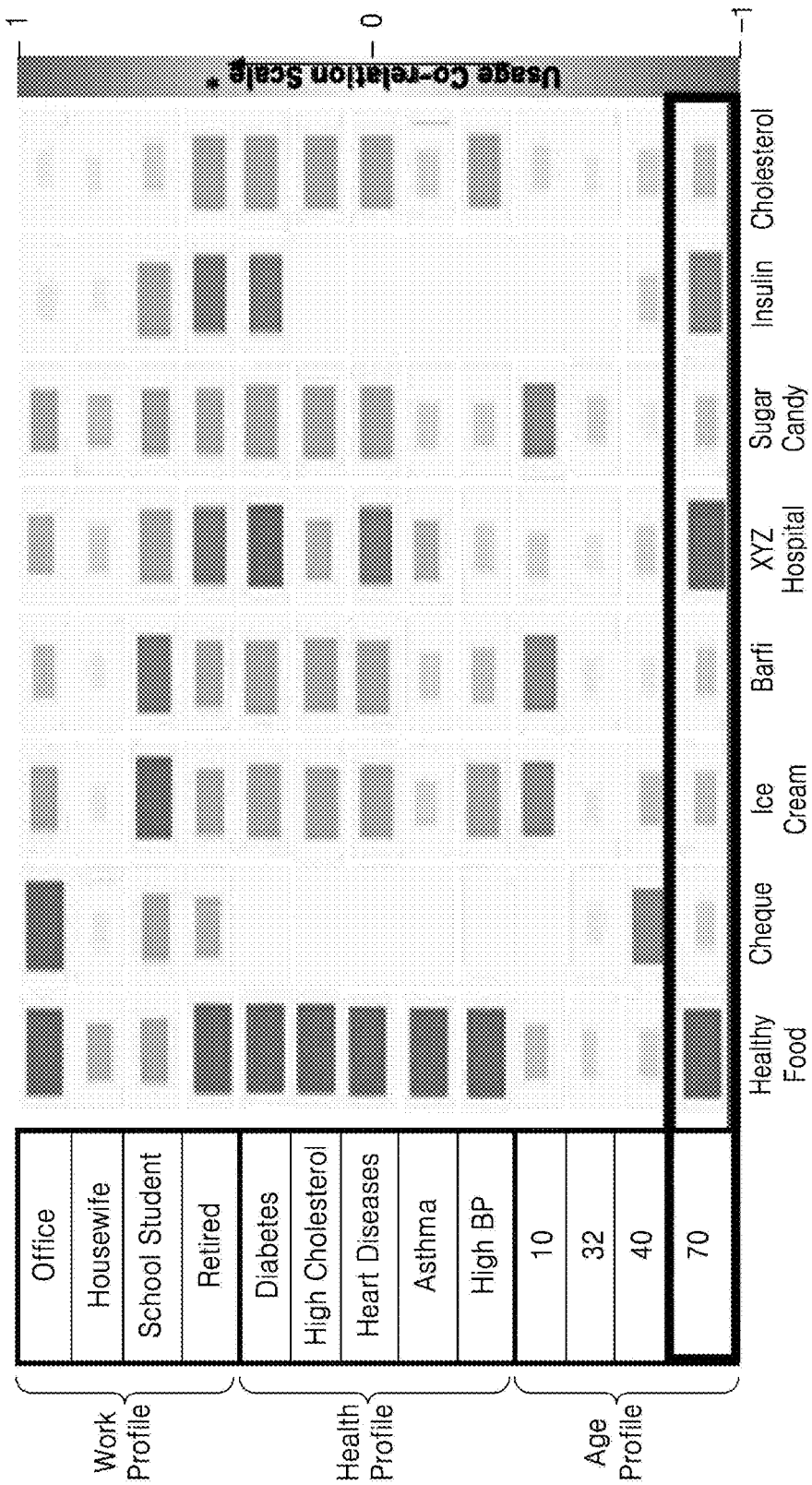
FIG. 5B is a diagram, illustrating an example co-relation of a heat map of a user with an age profile of 70 years, according to various embodiments.

FIG. 5B is a diagram, illustrating example co-relation of a heat map of a user with the age profile of 70 years, according to various embodiments.

The heat map indicates co-relation between the keywords from the user profile and the user query and the association of the words.

As seen in FIG. 5B, a healthy food and the 70 years olds are often associated with each other and often they are related in a positive manner, for example "Doctors recommend only healthy food for old people". There are some relation between a cheque and the 70 years old and they are often positively co-related.

The ice creams and the 70 years old are often associated in negative manner, because the Ice creams contain sugar which is not good for health". Similarly, the 70 year old and Barfi are negatively associated.

Hospitals and the 70 years old are often associated with each other in a positive manner They are advised to have regular health check-ups at the hospitals. Whereas, the co-relation between the 70 year old and sugar candies are often negatively associated. Example "sugar candies might cause diabetes."

Insulin is often positively associated with people of older age. Insulin shots are helpful for the old people to maintain their safe sugar level. Old age people are often advised to keep their cholesterol intake to minimum, because cholesterol is not good for their health, so often cholesterol and the 70 year old are negatively associated.

Thus, the co-relation of keywords help in generation more useful and harmless personalised responses.

Once the augmented query is generated, the intermediate response is obtained from the electronic device 300 for the augmented query. Further the intermediate response is sent to the response categorizer 304 for analysing and categorising the response.

Figure 6:
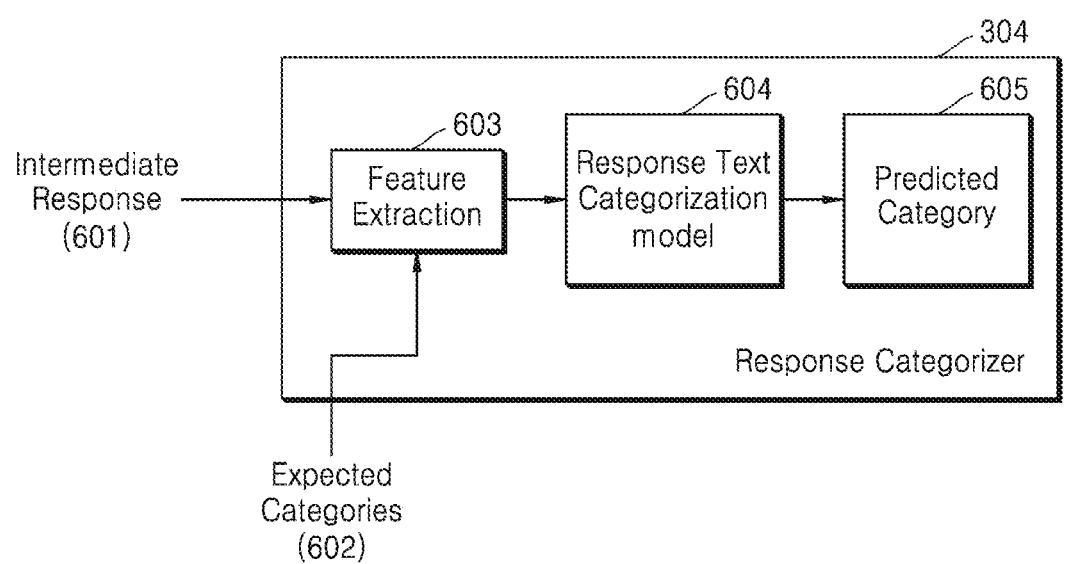
FIG. 6 is a block diagram, illustrating example categorization of an intermediate response, according to various embodiments.

FIG. 6 is a diagram, illustrating categorization of the intermediate response, according to various embodiments.

As seen in FIG. 6, the intermediate response 601 and the expected categories 602 for the intermediate response are fed as an input to the response categorizer 304.

For example, if the query is "Let me order a sugar free vanilla for you from Baskins", then the expected categories is Food, Education Health, Travel, Sports etc.

Each text in the intermediate response is converted to a feature set in the form of a vector. Features are extracted from the features set at 603. For example, "Help", "order", "Vanilla", "Ice Cream.

Further the extracted features and the features set are fed to a ML model specific to categorization. The ML model creates a response text categorization model 604. The response text categorization model 604 is used to find the response category based on the input and the intermediate response.

The output of the text categorization model based on the intermediate response is the category of the intermediate response as seen at 605.

Some examples of the intermediate response obtained from the electronic device 300 and their determined categories are given below.

| Intermediate Response | Categories |
|---|---|
| Should I order Vanilla Ice-cream | Food |
| Board Exam Schedule released | Education |
| Blood Pressure is normal through the day | Health |
| Best Time to travel to Kerala is October | Travel |
| Sachin Tendulkar got out at 99 | Sports |

After categorization of the intermediate response, the user resolver engine 305 determines at least one user whose perception is to be considered and determines the perception of the at least one other user using the response perception engine 306.

Figure 7A:
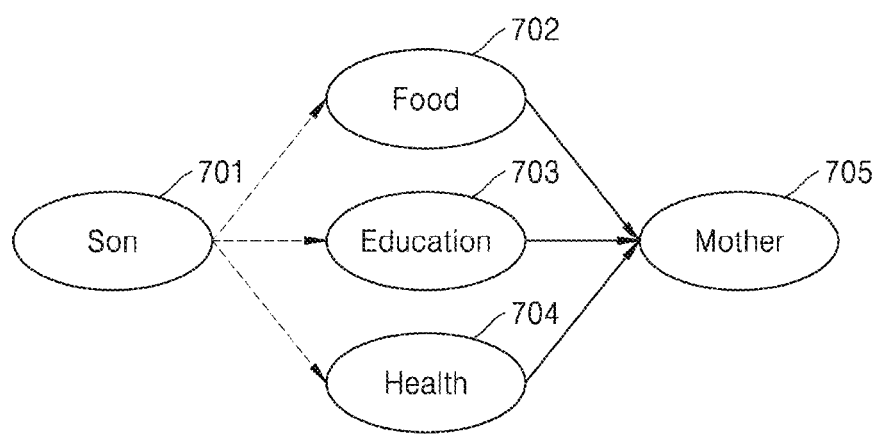
FIGS. 7A and 7B are diagrams, illustrating example interaction rules for determining at least one other user, according to various embodiments.
Figure 7B:
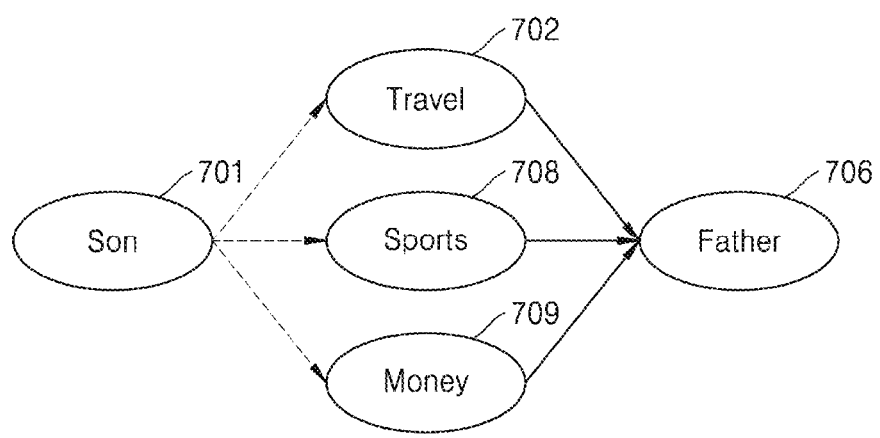

FIGS. 7A and 7B are diagrams illustrating example interaction rules for determining at least one other user, according to various embodiments.

The user resolver engine 305 uses interaction rules for determining the perception of the other user. As illustrated in FIG. 7A, an interaction rule 1 indicates the conversation between the son 701 and the mother 705. The rule 1 shows that the son 701 and the mother 705 are more often interacting on categories such as food 703, education 703 and health 704. Thus, the interaction rule determines the mother 702 as the other user for providing perception on the intermediate response and hence the mother 702 is selected for judging the intermediate response as harmful or useful for the son 702.

Similarly, an interaction rule 2 illustrated in FIG. 7B indicates the conversation between the son 701 and the father 706. The rule 2 shows that the son 701 and the father 706 are more often interacting on categories such as travel 707, sports 708 and money 709. Thus, the interaction rule determines father 706 as the other user for providing perception on the intermediate response and hence the father 706 is selected for judging the intermediate response with travel, sports and money as harmful or useful for the son 701.

Thus the user resolver engine 305 determines the other user by applying the interaction rule on the interaction between the user of the electronic device 300 and the other user.

Figure 8:
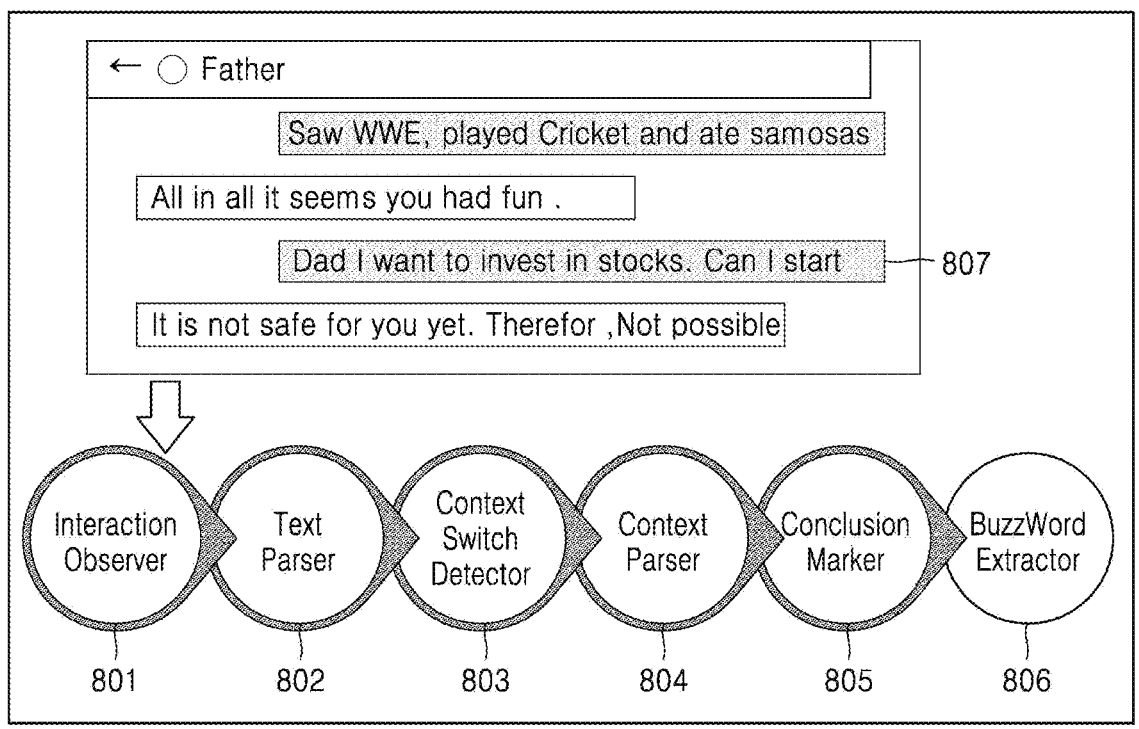
FIG. 8 is a diagram, illustrating different blocks of the response perception engine for determining a perception of the other user on the intermediate response, according to various embodiments.

FIG. 8 is a diagram, illustrating different blocks of the response perception engine 306 for determining the perception of the other user on the intermediate response, according to various embodiments. The response perception engine 306 comprises an interaction observer 801, a text parser 802, a context switch detector 803, a context parser 804, a conclusion marker 805 and a buzzword extractor 806, each of which may include various processing circuitry and/or executable program instructions.

The interaction observer 801, observers the interaction between the user of the electronic device 300 and the other user for the determined category of the intermediate response. For example, if the user is the son and the other user is the father, then the interaction between the son and the father is observed for predicting the perspective of the father on the intermediate response. For example, the interaction between the father and the son is Father: "What did you do at friends party son?
Son: Saw WWE, played Cricket and ate samosas.
Father: All in all it seems you had fun.
Son: Dad I want to invest in stocks. Can I start.
Father: It is not safe for you yet. Therefore, Not possible."

the text parser 802, applies the NLP on the interaction between the father and the son and extracts meaningful tokens based on the query. For example, for the mentioned interactions, the determined tokens are "friends|party-|son|WWE|Ate played|cricket| |samosas|All in all |fun|Dad-|want|invest|stocks|start|not safe|Therefore|Not possible".

The context switch detector 803 detects the change of a context in a conversation upon change in topic of discussion. The context switch detector 803 detects the change of context using existing methods using sentimental analysis.

The content parser 804 processes the different contexts received from ongoing conversation and applies text cleaning and differentiates the context in the conversation. For example, the content parser 306d differentiate two different contexts as Context 1: Friends|Party|Son|WWE| Played|Cricket|Samosas| All in all|Fun, and Context 2: Invest|Stocks|Not Possible|Therefore.

A conclusion marker 805 receives parsed contexts from which context concluding markers are extracted. For example, context 1: All in All, context 2: Therefore.

Similarly a buzzword extractor 806 extracts important conclusive words as per user's vocabulary. Context1: Fun, Context2: Not Safe 1 Not Possible.

The perception of the other user with respect to the intermediate response is determined by applying NLP on the output of the interaction observer 801, the text parser 802, the context switch detector 803, the context parser 804, the conclusion marker 805 and the buzzword extractor 806.

The perception of the other user and the intermediate response is sent as an input to the personalised NLG engine 307.

Figure 9:
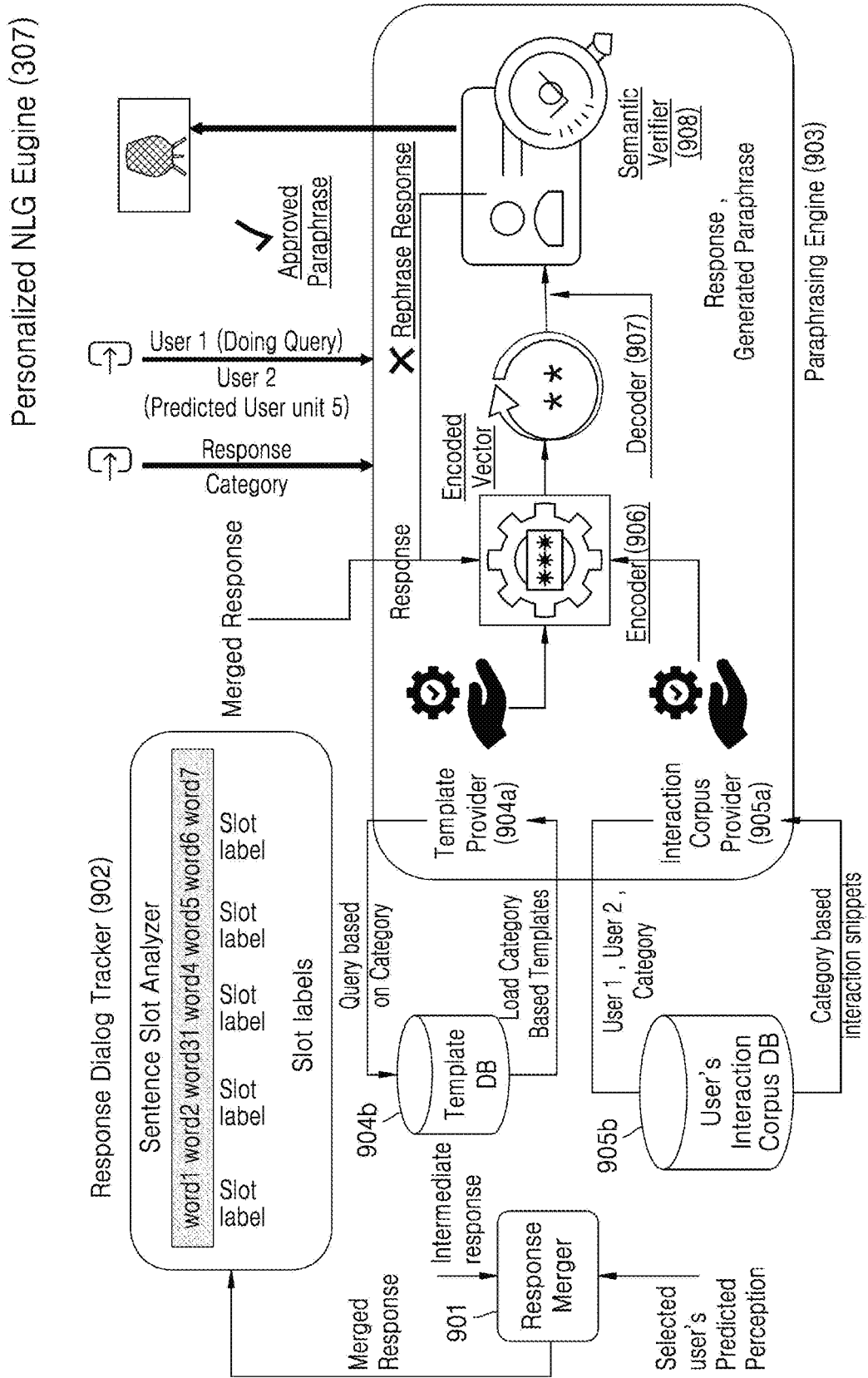
FIG. 9 is a diagram, illustrating an example architecture of a personalised NLG engine for generating a personalised final response, according to various embodiments.

FIG. 9 is a diagram, illustrating an example architecture of the personalised NLG engine 307 for generating the personalised final response, according to various embodiments.

The personalised NLG engine 307 comprises a response merger 901, a response dialog tracker 902, and a paraphrasing engine 903, each of which may include various processing circuitry and/or executable program instructions.

The response merger 901 merges the intermediate response of electronic device 300 with the perception of the other user generated by response perception engine 306 and provides a modified response. The response dialog tracker 902 analyses the modified response and find out variable slots in the sentence so that slots are used for paraphrasing.

The modified response and the slots are send to the paraphrasing engine 903. The paraphrasing engine 903 comprises multiple subunits such as a template provider 904a providing category based templates from a template database 904b and an interaction corpus provider 905a. The interaction corpus provider 905a take the response category as an input and provide intelligently selective templates and corpus from user's interaction corpus database 905b.

This template provider contains a static template of different category wise responses. The interaction corpus provider contains dynamic response templates created on the basis of interaction.

The paraphrasing engine 903 comprises an encoder 906 and a decoder 907. The encoder helps in encoding the multiple inputs of the selective components such as template, response, interaction corpus to encode a paraphrase in a vector component. The decoder then decodes to generate an interaction personalized paraphrase to the response.

Further, a semantic verifier 908 of the paraphrasing engine 903, takes the paraphrase and the modified response as inputs to verify if semantic of the paraphrase and the intermediate matches or not. Based on this matching the paraphrase is used as an output of the electronic device 300. The output of the electronic device 300 is the final personalized response for the user query.

Figure 10A:
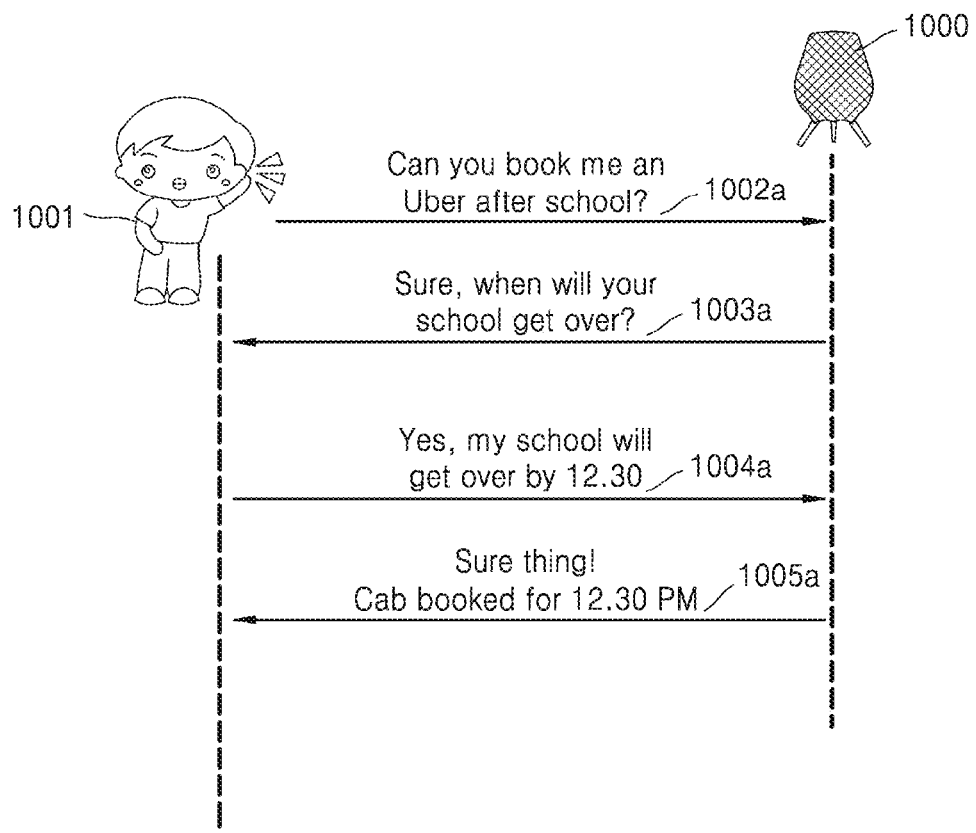
FIGS. 10A and 10B are signal flow diagrams, illustrating a comparative example scenario according to an existing method and the disclosed method, according to various embodiments.
Figure 10B:
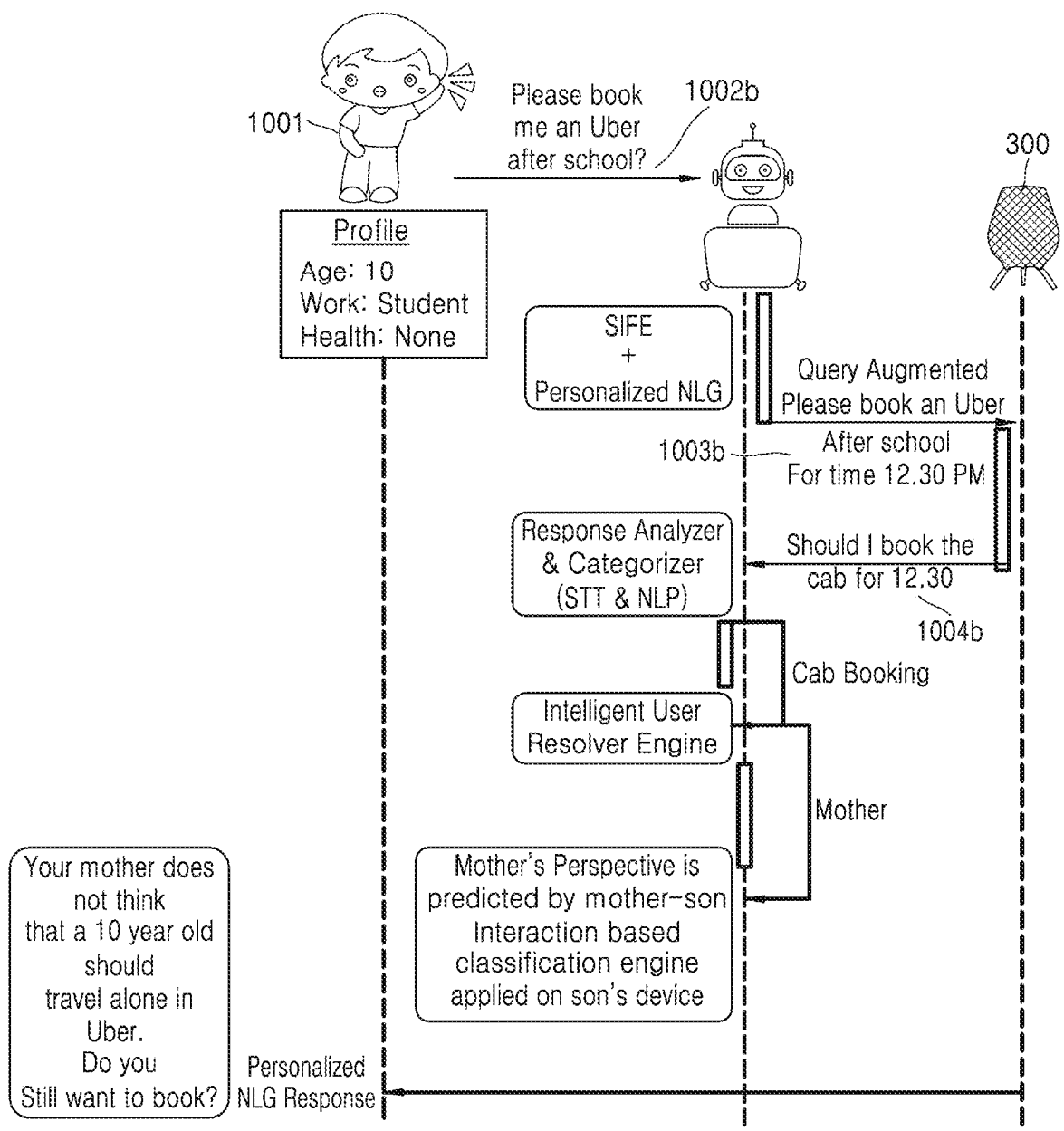

FIGS. 10A and 10B are signal flow diagrams illustrating a comparative example scenario of the prior art versus the disclosed method, according to various embodiments.

As seen in FIG. 10A, a user 1001 of a Virtual Assistant (VA) device 1000 ask a query "Hi! Can you book me an Uber after school?" to the VA device 1000 at 1002a. In the present embodiment the user is a school going boy, however the VA device 1000 is not aware of the user profile. As per prior art, the VA device 1000 responds to the boy with a query "Sure, when will your school get over?" at 1003a for obtaining additional information. At 1004a the user replies saying "Yes, my school will get over by 12.30". After receiving the additional information, the VA device 1000 books the cab and replies to the boy saying "Sure thing! Cab booked for 12.30 PM" at 1005*a*.

Thus as seen above, the problem with an existing system is that it requires a lot of cross questioning to finalize the final query. Further, the existing VA device 1000 will not check for mother's think process which applies the age restrictions on his son before making the booking. The disclosed method and the electronic device 300 addresses the above problem by taking the other user's (e.g. mother) perspective into consideration as seen in FIG. 10B.

As seen in FIG. 10B, the user 1001 sends a query "Please book me an Uber after school?" at 1002*b*. A profile of the user 1001 is pre-stored in the electronic device 300, or the electronic device 300 fetches the pre-stored user profile from a profile database in the memory 308. The user profile includes information that the Age: 10, the work data: Student and health data: None. As seen the augmented query is generated at 1002*b* by the augmented query generator 303. The augmented query is forwarded to the processor 309 of the electronic device 300 as, "Please book an Uber After school for time 12.30 PM". As seen, the disclosed method automatically generates the augmented query based on the user profile, the electronic device 300 need not ask the user 1001 for additional information. In response to the augmented query the intermediate response obtained is "Should I book the cab for 12.30" at 1004*b*.

Further, the response categorizer 304, the user resolver engine 305, the response perception engine 306, the personalised NLG engine 307, and the processor 309 works in synchronization to obtain the finalised personalised response based on the mother's perspective and the user profile. The final response of the electronic device 300 is "Your mother does not think that a 10 year old should travel alone in Uber. Do you Still want to book?" at 1006*b*.

Thus as seen in FIG. 10A the response provided by the prior art VA device 1000 for the query is harmful for the user 1001, whereas as seen in FIG. 10*b* the response provided for the same query by the disclosed method and the electronic device 300 is safe and useful for the user 1001.

Figure 11A:
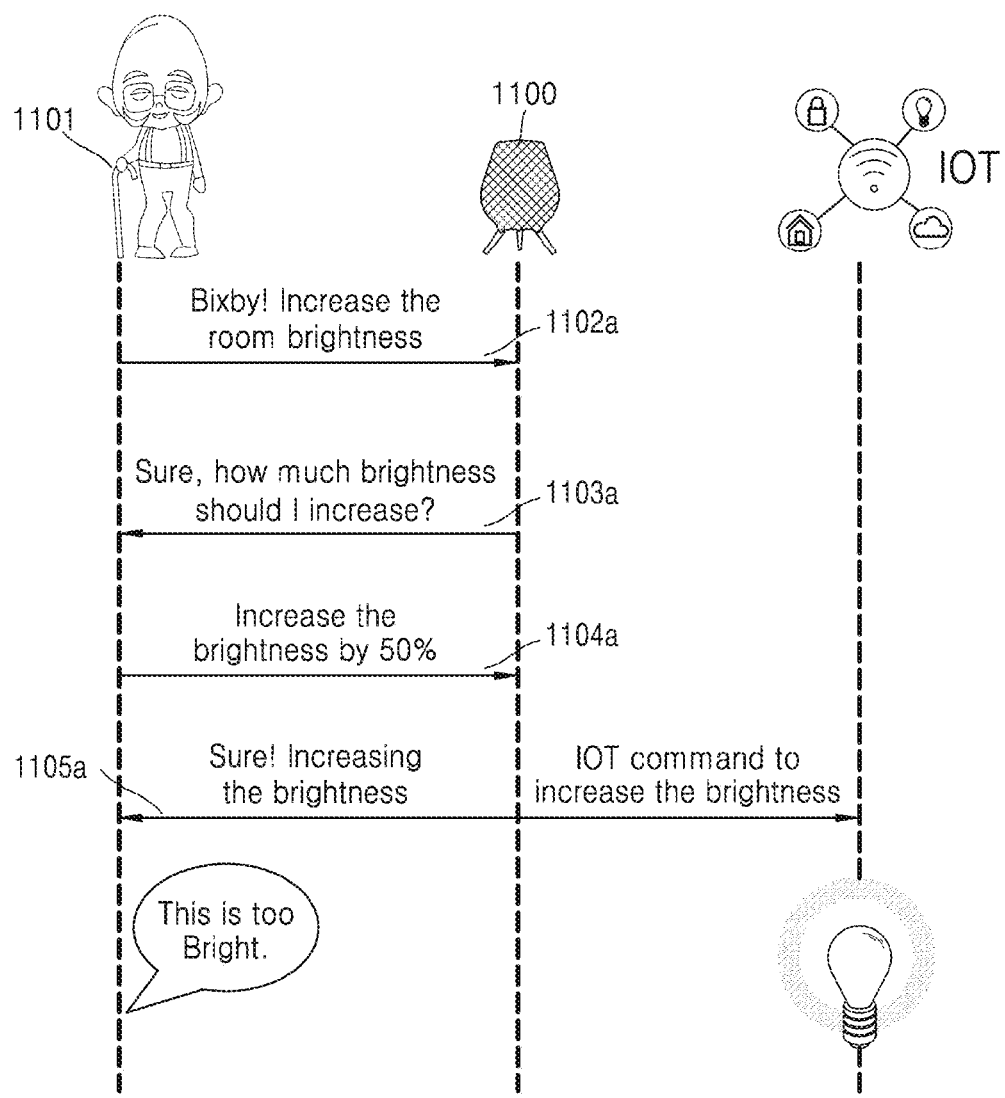
FIGS. 11A and 11B are signal flow diagrams, illustrating a comparative example scenario of a person with cataract increasing brightness, according to an existing method and the disclosed method, according to various embodiments.
Figure 11B:
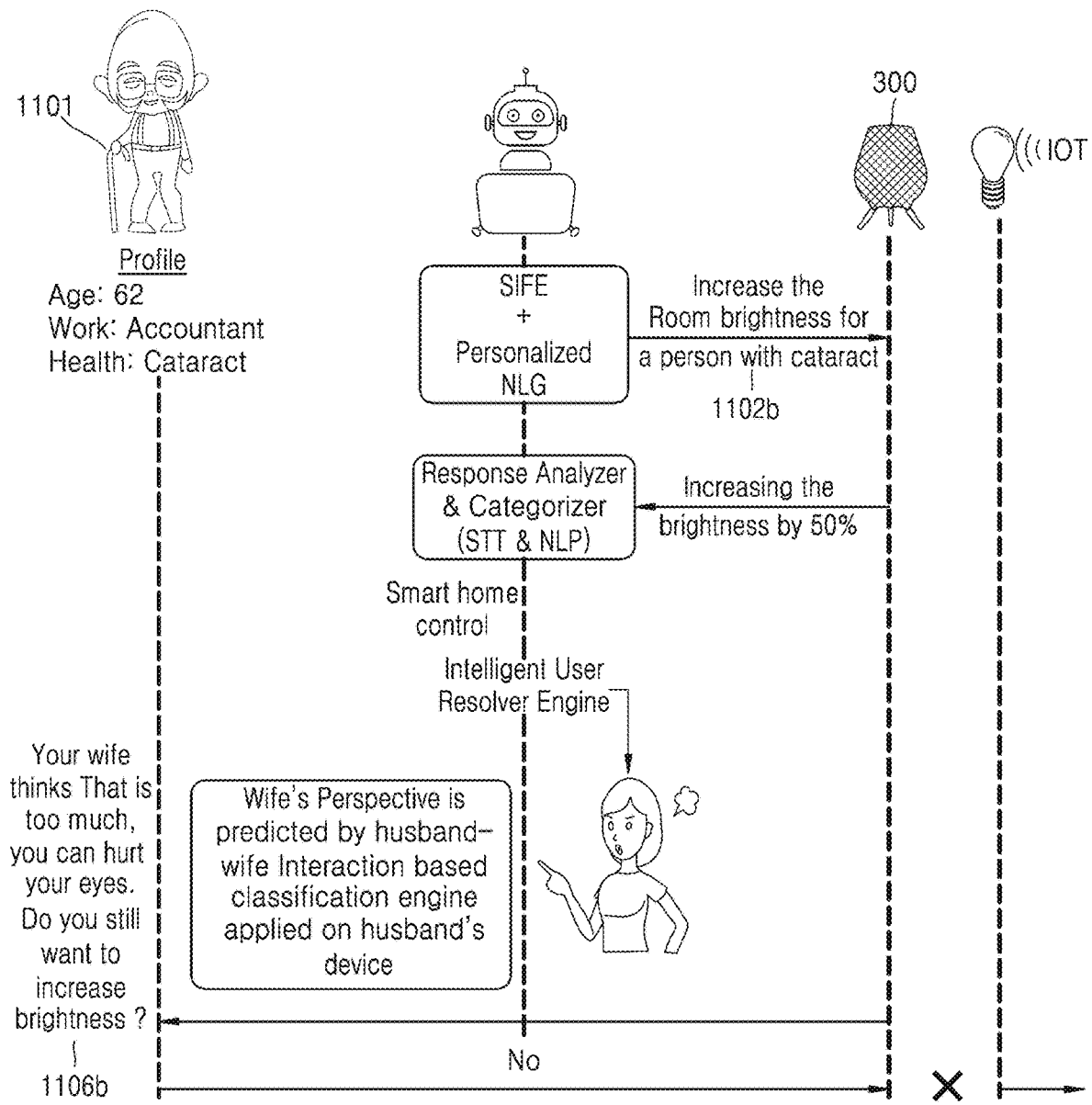

FIGS. 11A and 11B are signal flow diagrams illustrating a comparative example scenario of a person with cataract increasing brightness, for the prior art versus the disclosed method, according to various embodiments.

As seen in FIG. 11A, a user 1101 of a Virtual Assistant (VA) device 1100 instructs the VA device 1100 "Bixby!, Increase the room brightness" at 1102*a*. As per prior art, the VA device 1100 responds to the boy with a query "Sure, how much brightness should I increase?" at 1103*a* for obtaining extra additional information. At 1104*a* the user replies that "Increase the brightness by 50%". After receiving the additional information, the VA device 1100 commands the IoT lights to increase the brightness by 50% at 1105*a*. However, the user 1100 realises that the light is too bright and harmful to eyes.

Thus as seen above, the problem with the existing system is that it requires a lot of cross questioning to finalize the final query. The disclosed method and the electronic device 300 addresses the above problem by taking the other user's (e.g. wife's) perspective into consideration as seen in FIG. 10*b*.

As seen in FIG. 11B, the user 1101 sends a command/query "Increase the Room brightness". The profile of the user 1101 is pre-stored in the electronic device 300, or the electronic device 300 fetches the pre-stored user profile from the profile database in the memory 308. The user profile includes the information that the Age: 62, the work data: accountant, and health data: cataract. As seen the augmented query is generated at 1102*b* by the augmented query generator 303. The augmented query is forwarded to the processor 309 of the electronic device 300 as, "Increase the Room brightness for a person with cataract". As seen, the disclosed method automatically generates the augmented query based on the user profile, where the electronic device 300 need not ask the user 1101 for additional information. In response to the augmented query, the intermediate response obtained is "Increasing the brightness by 50%." Further, the response categorizer 304, the user resolver engine 305, the response perception engine 306, the personalised NLG engine 307, and the processor 309 works in synchronization to obtain the finalised personalised response based on the wife's perspective and the user profile. The final response of the electronic device 300 is "Your wife thinks that is too much, you can hurt your eyes. Do you still want to increase brightness" at 1006*b*.

Thus as seen in FIG. 11A the response provided by the prior art VA device 1000 for the query is harmful for the user 1101, whereas as seen in FIG. 11B the response provided for the same query by the disclosed method and the electronic device 300 is safe and useful for the user 1101.

Figure 12A:
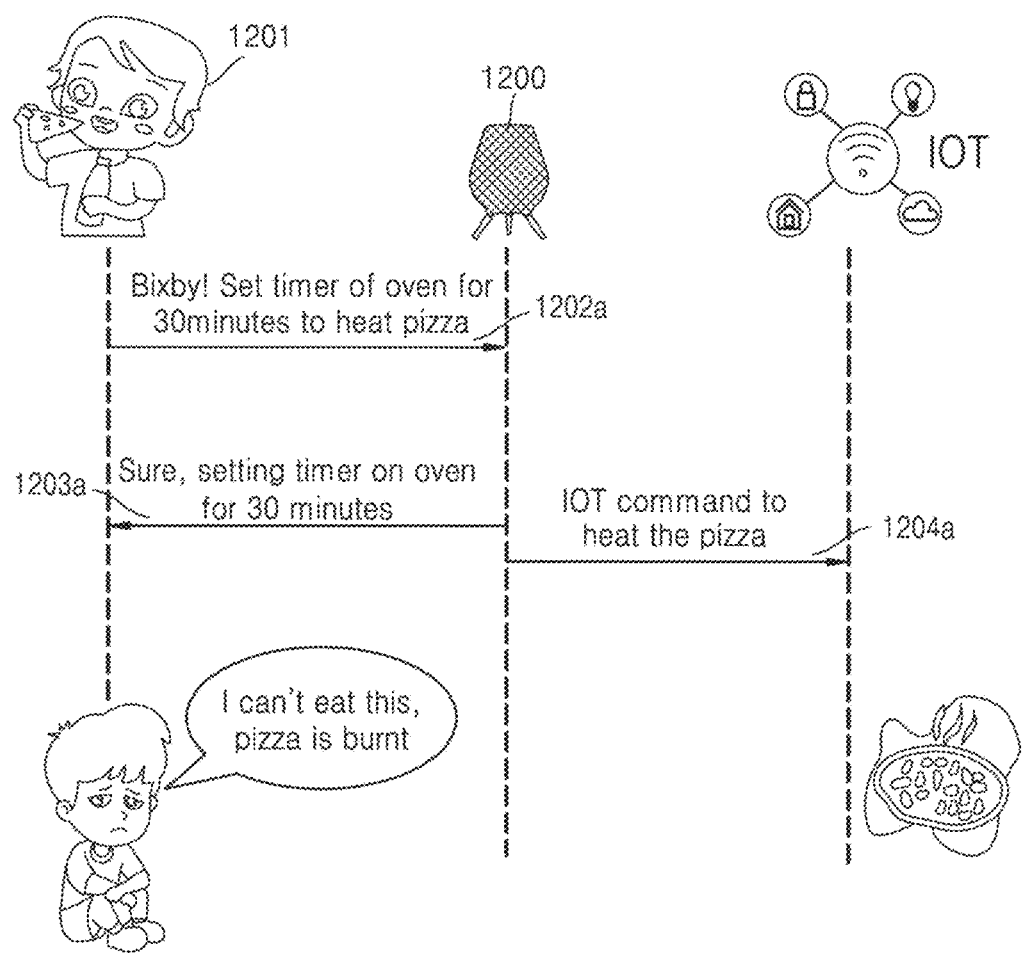
FIGS. 12A and 12B are signal flow diagrams, illustrating a comparative example scenario for the prior art versus the disclosed method, according to various embodiments.
Figure 12B:
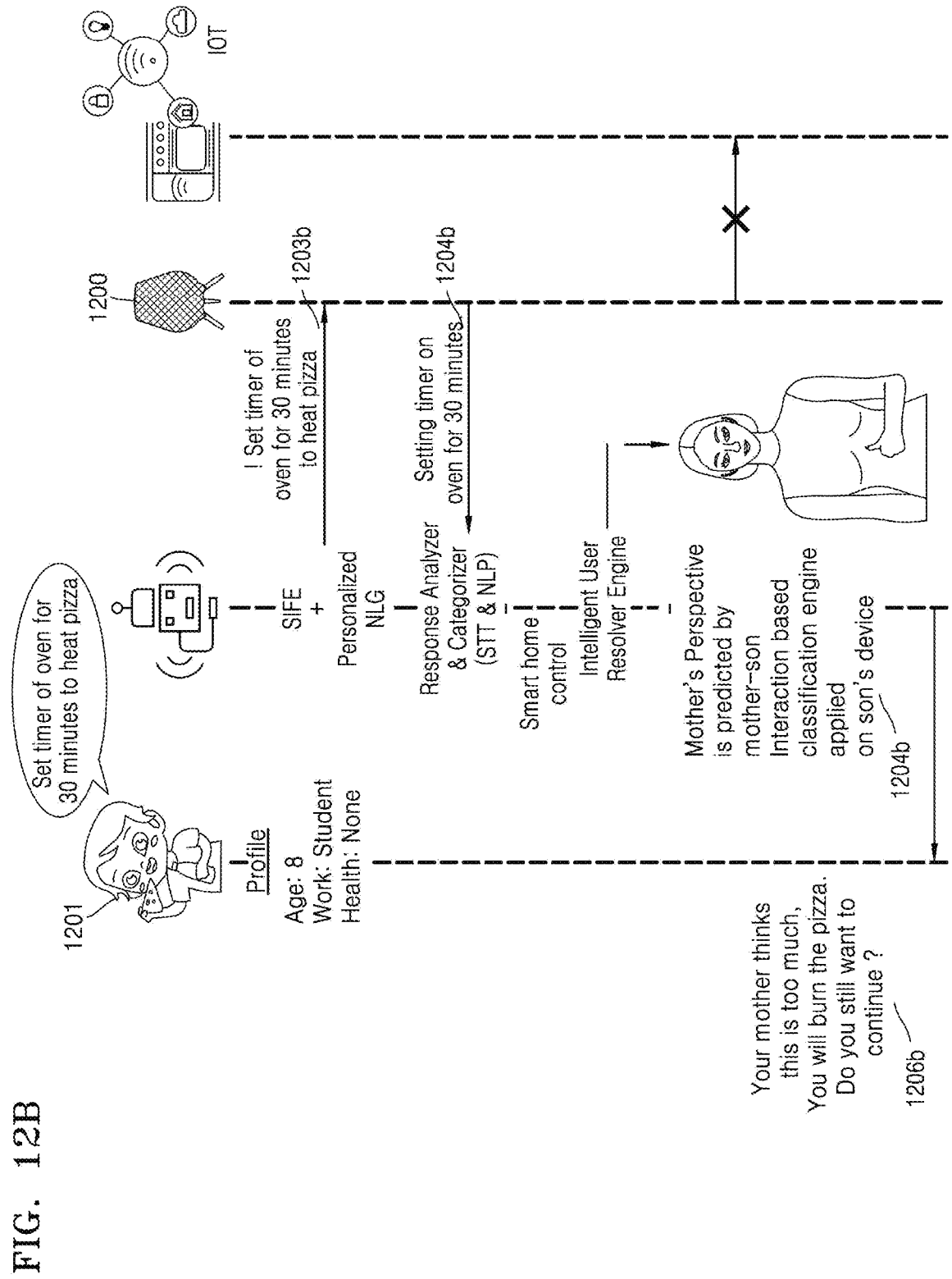

FIGS. 12A and 12B are signal flow diagrams illustrating a comparative example scenario for the prior art versus the disclosed method, according to various embodiments.

As seen in FIG. 12A, a user 1201 of a Virtual Assistant (VA) device 1200 asks the VA device 1200 "Set timer of oven for 30 minutes to heat pizza" at 1202*a*. As per prior art, the VA device 1200 responds to the boy "Sure, setting timer on oven for 30 minutes." at 1203*a*. At 1204*a* the VA device 1200 commands the IoT devices to heat the pizza for thirty minutes. However, the user 1100 realizes that the pizza is burnt after 30 minutes of heating and cannot be eaten.

Thus as seen above, the problem with existing system is that the current system without knowing that the user 1200 is small boy and won't be able to determine proper timing of heating the pizza, follows the user command, which ends up being useless for the user 1200.

The disclosed method and the electronic device 300 addresses the above problem by taking the other user's (e.g., mother's) perspective into consideration as seen in FIG. 12B.

As seen in FIG. 12B, the user 1200 sends a command/query "Set timer of oven for 30 minutes to heat pizza" at 1200*b*. The profile of the user 1200 is pre-stored in the electronic device 300, or the electronic device 300 fetches the pre-stored user profile from the profile database in the memory 308. The query is forwarded to the processor 309 of the electronic device 300 as it is, as there in no augmentation of the query at 1203*b*. In response to the query the intermediate response obtained is "Setting timer on oven for 30 minutes" at 1 1204*b*.

Further, the response categorizer 304, the user resolver engine 305, the response perception engine 306, the personalised NLG engine 307, and the processor 309 works in synchronization to obtain the finalised personalised response based on the mother's perspective and the user profile. The final response of the electronic device 300 is "Your mother thinks this is too much, You will burn the pizza. Do you still want to continue" at 1206*b*.

Thus as seen in FIG. 12A the response provided by the prior art VA device 1200 for the query is harmful for the user 1200, whereas as seen in FIG. 12B the response provided for the same query by the disclosed method and the electronic device 300 is safe and useful for the user 1200.

Figure 13:
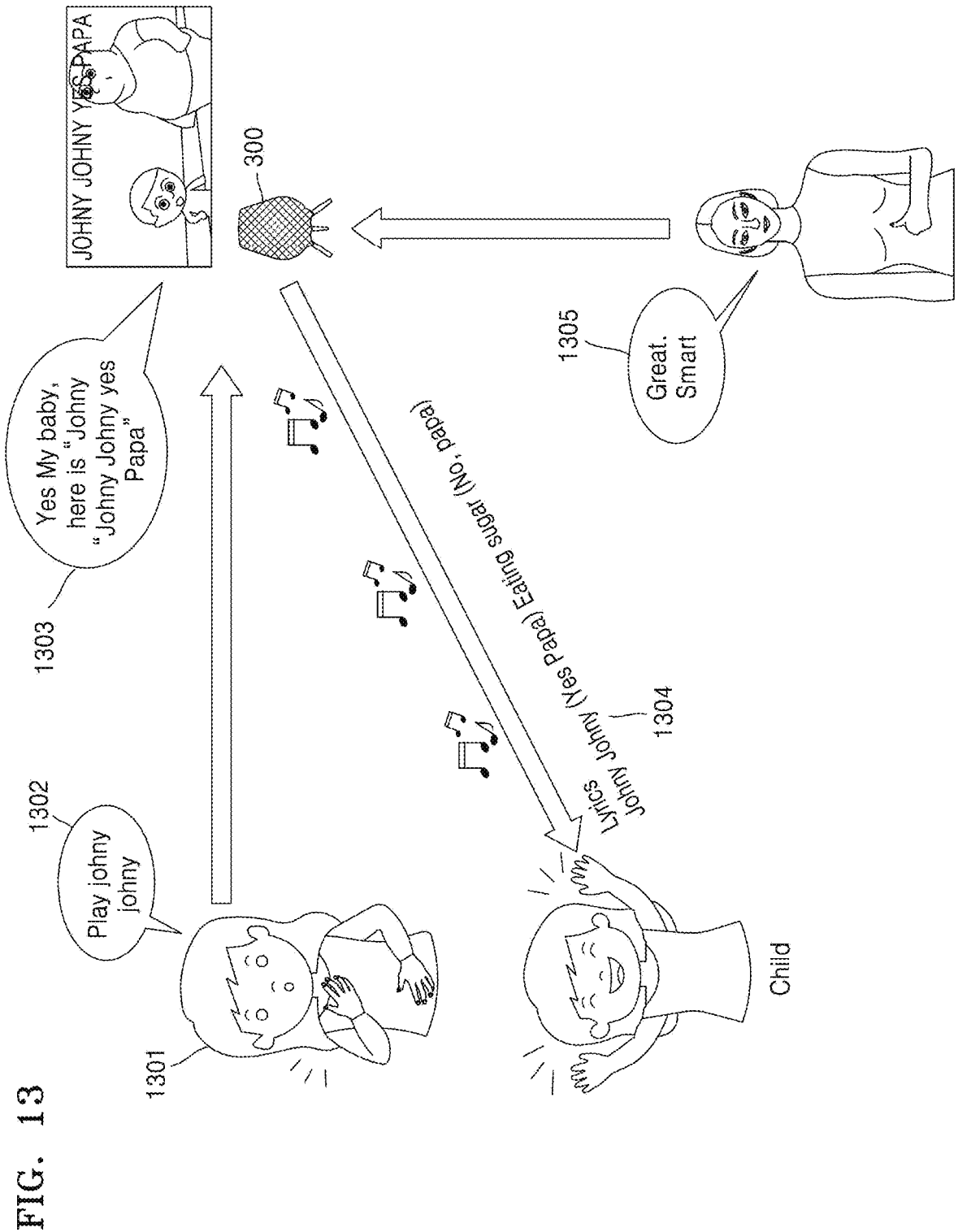
FIG. 13 is a diagram, illustrating the example scenario of FIG. 1 with the disclosed method and electronic device, according to various embodiments.

FIG. 13 is a diagram illustrating the example scenario of FIG. 1 with the disclosed method and electronic device 300, according to various embodiments.

As seen in FIG. 13, the user 1301 sends a command/query "play johny johny" at 1302. A profile of the user 1301 is pre-stored in the electronic device 300, or the electronic device 300 fetches the pre-stored user profile from the profile database in the memory 308. The user profile includes the information that the Age: 8 years, the work data: student, class 4. As seen the augmented query is generated at 1302 by the augmented query generator 303. The augmented query is forwarded to the processor 309 of the electronic device-300 as, "play johny johny for child". In response to the augmented query the intermediate response obtained is "Yes baby, here is Johny Johny yes Papa" at 1304.

Further, the response categorizer 304, the user resolver engine 305, the response perception engine 306, the personalized NLG engine 307, and the processor 309 works in synchronization to obtain the finalized personalized response based on the mother's perspective and the user profile. The final response of the electronic device 300 is "Playing Johny Johny yes papa from nursery rhymes" at 1306.

Thus as seen in FIG. 1 the response provided by the prior art VA device 3 for the query is harmful for the user 1301, whereas as seen in FIG. 13 the response provided for the same query by the disclosed method and the electronic device 300 is safe and useful for the user 1301.

FIG. 14 is a flowchart illustrating an example method 1400 for providing personalized response, according to various embodiments.

At 1402, the query is received from a user of the electronic device 300. The query may be a voice query, a gesture query and a text query.

At 1404, an augmented query is generated. In an embodiment the user profile associated with the user of the electronic device 300 is obtained based on the query, wherein the user profile comprises at the age profile data, the work profile data and the health profile data of the user of the electronic device 300. Further, keywords in the query with keywords of the user profile are mapped and a weight is assigned to each mapping. Keywords from the user profile and the keywords from the user query having highest weight are selected. The augmented query is generated using keywords having highest weight in the query and the corresponding information in the user profile.

At 1406, the intermediate response for the augmented query is obtained (determined).

At 1408, the intermediate response is categorized. In an embodiment features from the intermediate response are extracted, wherein each text from the intermediate response is transformed to a feature set in form of a vector. Further, the Machine Learning (ML) model specific for categorization of the intermediate response is trained using the extracted features. The ML model then determines the category of the intermediate response.

At 1410, at least one other user communicating with the user of the electronic device 300 is selected based on determined category of the intermediate response.

At 1412, the perception of the at least one other user based on the profile of the at least one other user and the communication history with the at least one other user is determined.

At 1414, the final response for the user of the electronic device 300 based on the perception of at least one other user and the determined intermediate response.

The various actions, acts, blocks, steps, or the like in the flow diagram may be performed in the order presented, in a different order or simultaneously. Further, in various embodiments, some of the actions, acts, blocks, steps, or the like may be omitted, added, modified, skipped, or the like without departing from the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for providing a personalized response from an electronic device in an Internet of Things (IoT) environment, the method comprising:
   receiving, by the electronic device, a user query from a user of the electronic device, wherein the query is one of a voice query, a gesture query or a text query;
   generating an augmented query by augmenting the user query based on a user profile of the user;
   determining, by the electronic device, an intermediate response for the augmented query;
   categorizing, by the electronic device, the intermediate response into one category of a plurality of different categories;
   analyzing, by the electronic device, communication histories of communications between the user and each of a plurality of other users;
   identifying, by the electronic device, based on the analyzed communication histories of communications between the user and each of the plurality of other users, at least one other user from among the plurality of other users whose communication history with the user includes communications for the category into which the intermediate response is categorized;
   obtaining, by the electronic device, information related to the user query from the communication history with the identified at least one other user; and
   generating, by the electronic device, a final response to the user query based on the intermediate response and the information related to the user query obtained from the communication history with the identified at least one other user.

2. The method of claim 1, wherein the user profile comprises at least one of age profile data, work profile data, or health profile data of the user of the electronic device and the generating, by the electronic device, of the augmented query comprises:
   mapping, by the electronic device, keywords in the query with keywords of the user profile;
   assigning, by the electronic device, a weight to each mapping;
   selecting, by the electronic device, keywords from the user profile and keywords from the user query having a highest weight; and
   generating, by the electronic device, the augmented query using the keywords having highest weight in the query and corresponding information in the user profile.

3. The method of claim 1, wherein the intermediate response includes a default response of the electronic device for the user query not based on the user profile.

4. The method of claim 1, wherein the categorizing, by the electronic device, of the intermediate response comprises:
    extracting, by the electronic device, features from the intermediate response, wherein each text from the intermediate response is transformed to a feature set in form of a vector;
    training, by the electronic device, a Machine Learning (ML) model specific for categorization of the intermediate response using the extracted features; and
    receiving, by the electronic device, a predicted category of the intermediate response from the ML model.

5. The method of claim 1, wherein the identifying, by the electronic device, of the at least one other user comprises:
    determining, by the electronic device, a list of other users whose communication history with the user includes communications for the category into which the intermediate response is categorized; and
    identifying, by the electronic device, the at least one other user from the list of other users based on an interaction rule.

6. The method of claim 1, wherein the obtaining, by the electronic device, of information related to the user query comprises:
    identifying, by the electronic device, at least one communication of the identified at least one other user with the user of the electronic device for the category;
    obtaining, by the electronic device, parsed text from the at least one communication based on keywords of the intermediate response;
    detecting, by the electronic device, a change in a context in the at least one communication based on the parsed text;
    obtaining, by the electronic device, a parsed context, wherein a context of the at least one communication is determined based on the parsed context;
    detecting, by the electronic device, a conclusion marker in the at least one communication, wherein the conclusion marker indicates a conclusion derived in the at least one communication for the determined context;
    determining, by the electronic device, a word based on the conclusion marker, wherein the word relates to the user query; and
    generating, by the electronic device, the information related to the user query based on the word, the user profile and the intermediate response using Natural Language Processing (NLP).

7. The method of claim 1, wherein the generating, by the electronic device, of the final response comprises:
    merging, by the electronic device, the information obtained from the communication history and the intermediate response to obtain a merged response;
    determining, by the electronic device, at least one slot in the merged response, wherein the at least one slot indicates variable words in the merged response to be replaced by other words corresponding to the user of the electronic device;
    selecting, by the electronic device, a user template from a template database based on the category of the intermediate response and the communication history between the user of the electronic device and the identified at least one other user;
    encoding, by the electronic device, the user template, the merged response, and the communication history between the user and the identified at least one other user to obtain a combination paraphrase in a vector form;
    decoding, by the electronic device, the combination paraphrase to generate a personalized paraphrase;
    determining, by the electronic device, that a semantic of the intermediate response and the combination paraphrase matches; and
    generating, by the electronic device, the final response to the user query based on the combination paraphrase.

8. An electronic device configured to provide a personalized response in an Internet of Things (IoT) environment, the electronic device comprising:
    memory; and
    at least one processor, including processing circuitry and coupled to the memory,
    wherein the memory stores instructions which, when executed by the at least one processor individually and/or collectively, cause the electronic device to perform operations comprising:
        receiving a user query from a user, wherein the query includes one of a voice query, a gesture query or a text query;
        generating an augmented query by augmenting the user query based on a user profile of the user;
        determining an intermediate response for the augmented query;
        categorizing the intermediate response into one category of a plurality of different categories;
        analyzing communication histories of communications between the user and each of a plurality of other users;
        identifying, based on the analyzed communication histories of communications between the user and each of the plurality of other users, at least one other user from among the plurality of other users whose communication history with the user includes communications for the category into which the intermediate response is categorized;
        obtaining information related to the user query from the communication history with the identified at least one other user; and
        generating a final response to the user query based on the intermediate response and the information related to the user query obtained from the communication history with the identified at least one other user.

9. The electronic device of claim 8, wherein the user profile comprises at least one of age profile data, work profile data, or health profile data of the user of the electronic device and the generating of the augmented query comprises:
    mapping keywords in the query with keywords of the user profile;
    assigning a weight to each mapping;
    selecting keywords from the user profile and keywords from the user query having highest weight; and
    generating the augmented query using the keywords having highest weight in the query and corresponding information in the user profile.

10. The electronic device of claim 8, wherein the intermediate response includes a default response of the electronic device for the user query not based on the user profile.

11. The electronic device of claim 8, wherein the instructions, when executed by the at least one processor individually and/or collectively, cause the electronic device to perform operations comprising:
    extracting features from the intermediate response, wherein each text from the intermediate response is transformed to a feature set in form of a vector;

training a Machine Learning (ML) model specific to categorization of the intermediate response using the extracted features; and receiving a predicted category of the intermediate response from the ML model.

12. The electronic device of claim 8, wherein the instructions, when executed by the at least one processor individually and/or collectively, cause the electronic device to perform operations comprising:

determining a list of other users whose communication history with the user includes communications for the category into which the intermediate response is categorized; and identifying the at least one other user from the list of other users based on an interaction rule.

13. The electronic device of claim 8, wherein the instructions, when executed by the at least one processor individually and/or collectively, cause the electronic device to perform operations comprising:

identifying at least one communication of the identified at least one other user with the user of the electronic device for a predicted category;

obtaining parsed text from the at least one communication based on keywords of the intermediate response;

detecting a change in a context in the at least one communication based on the parsed text;

obtaining a parsed context, wherein the parsed context determines a context of the at least one communication;

detecting a conclusion marker in the at least one communication, wherein the conclusion marker indicates a conclusion derived in the at least one communication for the determined context;

determining a word based on the conclusion marker, wherein the word relates to the user query; and generating the information related to the user query based on the word, the user profile and the intermediate response using Natural Language Processing (NLP).

14. The electronic device of claim 8, wherein the instructions, when executed by the at least one processor individually and/or collectively, cause the electronic device to perform operations comprising:

merging the information obtained from the communication history and the intermediate response to obtain a merged response;

determining at least one slot in the merged response, wherein the at least one slot indicates variable words in the merged response to be replaced by other words corresponding to the user of the electronic device;

selecting a user template from a template database based on the category of the intermediate response and the communication history between the user of the electronic device and the identified at least one other user;

encoding the user template, the merged response, and the communication history between the user and the at least one other user to obtain a combination paraphrase in a vector form;

decoding the combination paraphrase to generate a personalized paraphrase;

determining that a semantic of the intermediate response and the combination paraphrase matches; and generating the final response to the user query based on the combination paraphrase.

15. One or more non-transitory computer-readable storage media storing instructions which, when executed by at least one processor of an electronic device, cause the electronic device to perform operations comprising:

receiving, by the electronic device, a user query from a user of the electronic device, wherein the query is one of a voice query, a gesture query or a text query;

generating an augmented query by augmenting the user query based on a user profile of the user;

determining, by the electronic device, an intermediate response for the augmented query;

categorizing, by the electronic device, the intermediate response into one category of a plurality of different categories;

analyzing, by the electronic device, communication histories of communications between the user and each of a plurality of other users;

identifying, by the electronic device, based on the analyzed communication histories of communications between the user and each of the plurality of other users, at least one other user of the plurality of other users whose communication history with the user includes communications for the category into which the intermediate response is categorized;

obtaining, by the electronic device, information related to the user query from the communication history with the identified at least one other user; and generating, by the electronic device, a final response to the user query based on the intermediate response and the information related to the user query obtained from the communication history with the identified at least one other user.

* * * * *